US012462764B2

(12) United States Patent
Li et al.

(10) Patent No.: US 12,462,764 B2
(45) Date of Patent: Nov. 4, 2025

(54) ADJUSTING PARAMETERS OF A DISPLAY PANEL COMPRISING GRAY COEFFICIENT AND WHITE POINT POSITION

(71) Applicants: HEFEI BOE OPTOELECTRONICS TECHNOLOGY CO., LTD., Hefei (CN); BOE TECHNOLOGY GROUP CO., LTD., Beijing (CN)

(72) Inventors: Jingyong Li, Beijing (CN); Baojun Zheng, Beijing (CN)

(73) Assignees: HEFEI BOE OPTOELECTRONICS TECHNOLOGY CO., LTD., Hefei (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/574,157

(22) PCT Filed: Nov. 30, 2022

(86) PCT No.: PCT/CN2022/135472

§ 371 (c)(1),
(2) Date: Dec. 26, 2023

(87) PCT Pub. No.: WO2024/113232

PCT Pub. Date: Jun. 6, 2024

(65) Prior Publication Data

US 2025/0104656 A1 Mar. 27, 2025

(51) Int. Cl.
*G09G 3/36* (2006.01)
*G09G 3/34* (2006.01)

(52) U.S. Cl.
CPC ......... *G09G 3/3413* (2013.01); *G09G 3/3607* (2013.01); *G09G 2320/0247* (2013.01);
(Continued)

(58) Field of Classification Search
CPC ...... G09G 3/36; G09G 3/3611; G09G 3/3614; G09G 3/3622; G09G 3/3625; G09G 3/364;
(Continued)

(56) References Cited

U.S. PATENT DOCUMENTS 6,844,881 B1 1/2005 Chen et al.
10,636,383 B2 4/2020 Zhang
(Continued)

FOREIGN PATENT DOCUMENTS

CN 102005186 A 4/2011
CN 102568366 A 7/2012
(Continued)

OTHER PUBLICATIONS

International Search Report in PCT/CN2022/135472 in Chinese dated Aug. 9, 2023 with English translation.
(Continued)

*Primary Examiner* — Ke Xiao
*Assistant Examiner* — Nelson Lam
(74) *Attorney, Agent, or Firm* — Collard & Roe, P.C.

(57) ABSTRACT

An adjusting method of a display panel, an adjusting apparatus of a display panel, an electronic device, a computer-readable storage medium. The adjusting method includes: acquiring a detection coordinate value of a white point of the display panel in work; determining a target adjustment mode from at least two adjustment modes according to the detection coordinate value, in which the at least two adjustment modes include a first adjustment mode and a second adjustment mode; adjusting some of parameters on the basis of the target adjustment mode, the parameters of the display panel include a grayscale coefficient and a white point setting position, adjusting the grayscale coefficient and taking the detection coordinate value as the white point setting position
(Continued)

in the first adjustment mode, adjusting the grayscale coefficient and adjusting the white point setting position according to the detection coordinate value in the second adjustment mode.

18 Claims, 14 Drawing Sheets

(52) U.S. Cl.
CPC ............... *G09G 2320/0626* (2013.01); *G09G 2320/0666* (2013.01); *G09G 2320/0693* (2013.01); *G09G 2340/06* (2013.01)

(58) Field of Classification Search
CPC .. G09G 3/3644; G09G 3/3648; G09G 3/3655; G09G 3/3659; G09G 3/3666; G09G 3/3674; G09G 3/3677; G09G 3/3681; G09G 3/3685; G09G 3/3688; G09G 3/3692; G09G 3/3696; G09G 2320/0247; G09G 2320/0626; G09G 2320/0633; G09G 2320/0666; G09G 2320/0693; G09G 2320/08
USPC .................................................... 345/87–104
See application file for complete search history.

(56) References Cited

U.S. PATENT DOCUMENTS 11,810,520 B2 11/2023 Li et al.
2005/0083341 A1 4/2005 Higgins et al.
2007/0052735 A1* 3/2007 Chou ..................... G09G 5/026 348/E17.005
2007/0126661 A1* 6/2007 Kao ......................... G09G 3/20 345/63
2009/0262114 A1 10/2009 Park et al.
2010/0259686 A1* 10/2010 Kao ......................... H04N 9/73 348/658
2012/0162168 A1 6/2012 Ku et al.
2014/0204130 A1* 7/2014 Sugiyama ................ G09G 3/20 345/88
2018/0308452 A1* 10/2018 Zhang ...................... G09G 5/02
2020/0105179 A1* 4/2020 Greenebaum ........ G09G 3/2051
2020/0357360 A1* 11/2020 Marcu ...................... G09G 5/02
2021/0097920 A1* 4/2021 Yu ........................ G09G 3/2007
2021/0166606 A1* 6/2021 Han ....................... G09G 3/006
2023/0162690 A1* 5/2023 Li ........................ G09G 3/3283 345/77
2023/0282178 A1* 9/2023 Yang .................... G06V 10/141 345/207
2024/0212647 A1* 6/2024 Wang ..................... G09G 3/006

FOREIGN PATENT DOCUMENTS

CN 105989810 A 10/2016
CN 107038995 A 8/2017
CN 107068114 A 8/2017
CN 107221272 A 9/2017
CN 109308861 A 2/2019
CN 111402817 A 7/2020
CN 112037712 A 12/2020
JP 2017092718 A 5/2017
WO 2013/088780 A 6/2013
WO 2021/196791 A1 10/2021

OTHER PUBLICATIONS

Written Opinion of the International Searching Authority in PCT/CN2022/135472 in Chinese dated Aug. 9, 2023.
Viewing Angle Controllable Coplanar Conversion Type LCD Monitor , China Outstanding Master's Degree Thesis Full Text Database, 49 pages.
Xiao et al, Visual gamma correction for LCD displays, Research Gate: Displays 32, 2011, pp. 17-23.
Fu, Mingzhu, Viewing Angle Controllable Coplanar Conversion Type LCD Monitor; China Outstanding Master's Degree Thesis Full Text Database, Dec. 20, 2017; 49 pages.

* cited by examiner

| a relationship between the color coordinate Wx and the luminance | | | | | | |
|---|---|---|---|---|---|---|
| | | detection of white point (0.315, 0.323,417) | | | | |
| | number | white point setting | | after adjusting | | |
| | | Wx | Wy | Wx | Wy | Lv |
| adjusted coordinates and brightness | 1 | 0.315 | 0.323 | 0.315 | 0.323 | 415 |
| | 2 | 0.314 | 0.323 | 0.314 | 0.323 | 415 |
| | 3 | 0.313 | 0.323 | 0.313 | 0.323 | 414 |
| | 4 | 0.312 | 0.323 | 0.312 | 0.323 | 413 |
| | 5 | 0.311 | 0.323 | 0.311 | 0.323 | 412 |
| | 6 | 0.31 | 0.323 | 0.31 | 0.323 | 409 |
| | 7 | 0.309 | 0.323 | 0.309 | 0.322 | 405 |
| | 8 | 0.307 | 0.323 | 0.307 | 0.322 | 401 |
| | 9 | 0.307 | 0.323 | 0.307 | 0.32 | 400 |
| | 10 | 0.306 | 0.323 | 0.306 | 0.32 | 398 |
| | 11 | 0.304 | 0.323 | 0.304 | 0.319 | 392 |
| | 12 | 0.302 | 0.323 | 0.302 | 0.318 | 394 |
| | | 0.302 | 0.323 | 0.302 | 0.32 | 394 |
| WX change | | | | 0.013 | | 23 |

FIG. 6D

| | | | | | | |
|---|---|---|---|---|---|---|
| | detection of white point (0.302, 0.320, 394) | | | | | |
| | number | target white point setting | | after adjusting | | |
| | | Wx | Wy | Wx | Wy | Lv |
| adjusted coordinates and brightness | 1 | 0.3 | 0.313 | 0.302 | 0.315 | 383 |
| | 2 | 0.3 | 0.311 | 0.302 | 0.311 | 375 |
| | 3 | 0.3 | 0.309 | 0.302 | 0.309 | 369 |
| | 4 | 0.3 | 0.307 | 0.303 | 0.305 | 361 |
| | 5 | 0.3 | 0.305 | 0.303 | 0.303 | 356 |
| | 6 | 0.3 | 0.303 | 0.304 | 0.3 | 350 |
| | 7 | 0.3 | 0.301 | 0.304 | 0.298 | 345 |
| | 8 | 0.3 | 0.299 | 0.304 | 0.295 | 339 |
| | 9 | 0.3 | 0.297 | 0.305 | 0.292 | 333 |
| | 10 | 0.3 | 0.295 | 0.305 | 0.29 | 328 |
| | 11 | 0.3 | 0.293 | 0.305 | 0.286 | 321 |
| color coordinate Wy change | | | | | 0. 034 | 73 |

ADJUSTING PARAMETERS OF A DISPLAY PANEL COMPRISING GRAY COEFFICIENT AND WHITE POINT POSITION

CROSS REFERENCE TO RELATED APPLICATIONS

This application is the National Stage of PCT/CN2022/135472 filed on Nov. 30, 2022, the disclosure of which is incorporated by reference.

TECHNICAL FIELD

Embodiments of the present disclosure relate to an adjusting method of a display panel, an adjusting apparatus of a display panel, an electronic device, and a computer-readable storage medium.

BACKGROUND

With the development of display technologies, display panels have been increasingly widely used. In order to achieve better display effects, parameters of display panels may be corrected, for example, the gamma (gamma) coefficient and positions of white points may be corrected.

SUMMARY

At least one embodiment of the present disclosure provides an adjusting method of a display panel, which comprises: acquiring a detection coordinate value of a white point of the display panel in work; determining a target adjustment mode from at least two adjustment modes according to the detection coordinate value, in which the at least two adjustment modes comprise a first adjustment mode and a second adjustment mode; and adjusting at least some of parameters of the display panel on the basis of the target adjustment mode, and the parameters of the display panel comprise a grayscale coefficient and a white point setting position, adjusting the grayscale coefficient and taking the detection coordinate value as the white point setting position in the first adjustment mode, and adjusting the grayscale coefficient and adjusting the white point setting position according to the detection coordinate value in the second adjustment mode.

For example, in the adjusting method provided by an embodiment of the present disclosure, determining a target adjustment mode from at least two adjustment modes according to the detection coordinate value comprises: acquiring a desired coordinate range of the white point; and determining the first adjustment mode to be the target adjustment mode in a case where the detection coordinate value is in the desired coordinate range.

For example, in the adjusting method provided by an embodiment of the present disclosure, determining a target adjustment mode from at least two adjustment modes according to the detection coordinate value comprises: acquiring a desired coordinate range of the white point; and determining the second adjustment mode to be the target adjustment mode in a case where the detection coordinate value is outside the desired coordinate range.

For example, in the adjusting method provided by an embodiment of the present disclosure, acquiring a desired coordinate range of the white point comprises: acquiring a preset coordinate value and a permissible offset value of the white point; and determining the desired coordinate range according to the preset coordinate value and the permissible offset value.

For example, in the adjusting method provided by an embodiment of the present disclosure, adjusting at least some of parameters of the display panel on the basis of the target adjustment mode comprises: determining a target coordinate value of the white point according to the detection coordinate value, in which the target coordinate value is in the desired coordinate range; and adjusting the white point setting position according to the target coordinate value so that the adjusted white point setting position is located at the target coordinate value.

For example, in the adjusting method provided by an embodiment of the present disclosure, determining a target coordinate value of the white point according to the detection coordinate value comprises: determining a point within the desired coordinate range that is closest in distance to the detection coordinate value; and taking a coordinate of the closest point as the target coordinate value.

For example, in the adjusting method provided by an embodiment of the present disclosure, the desired coordinate range is from a first boundary coordinate to a second boundary coordinate in a first direction and from a third boundary coordinate to a fourth boundary coordinate in a second direction, the first boundary coordinate is less than the second boundary coordinate and the third boundary coordinate is less than the fourth boundary coordinate; the detection coordinate value comprises a first detection coordinate and a second detection coordinate; and determining a target coordinate value of the white point according to the detection coordinate value comprises: if the first detection coordinate is in the desired coordinate range and the second detection coordinate is greater than the fourth boundary coordinate, taking the first detection coordinate and the fourth boundary coordinate as the target coordinate value; if the first detection coordinate is in the desired coordinate range and the second detection coordinate is less than the third boundary coordinate, taking the first detection coordinate and the third boundary coordinate as the target coordinate value; if the second detection coordinate is in the desired coordinate range and the first detection coordinate is greater than the second boundary coordinate, taking the second boundary coordinate and the second detection coordinate as the target coordinate value; and if the second detection coordinate is in the desired coordinate range and the first detection coordinate is less than the first boundary coordinate, taking the first boundary coordinate and the second detection coordinate as the target coordinate value.

For example, in the adjusting method provided by an embodiment of the present disclosure, determining a target coordinate value of the white point according to the detection coordinate value comprises: if the first detection coordinate is greater than the second boundary coordinate and the second detection coordinate is greater than the fourth boundary coordinate, taking the second boundary coordinate and the fourth boundary coordinate as the target coordinate value; if the first detection coordinate is less than the first boundary coordinate and the second detection coordinate is less than the third boundary coordinate, taking the first boundary coordinate and the third boundary coordinate as the target coordinate value; if the first detection coordinate is greater than the second boundary coordinate and the second detection coordinate is less than the third boundary coordinate, taking the second boundary coordinate and the third boundary coordinate as the target coordinate value; and if the first detection coordinate is less than the first boundary coordinate and the second detection coordinate is greater than the fourth boundary coordinate, taking the first boundary coordinate and the fourth boundary coordinate as the target coordinate value.

For example, the adjusting method provided by an embodiment of the present disclosure, further comprises: after adjusting at least some of the parameters of the display panel, recording an acquired grayscale coefficient in a first storage location and recording the acquired white point setting position in a second storage location.

For example, in the adjusting method provided by an embodiment of the present disclosure, recording the acquired white point setting position in a second storage location comprises: checking whether the adjusted white point setting position is located at the target coordinate value after adjusting the white point setting position; and if the adjusted white point setting position is located at the target coordinate value, recording the adjusted white point setting position in the second storage location.

For example, in the adjusting method provided by an embodiment of the present disclosure, acquiring a detection coordinate value of a white point of a display panel in work comprises: adjusting backlight luminance of the display panel to a preset luminance range; and determining the detection coordinate value of the white point on the basis of collected optical information of a white screen of the display panel.

For example, in the adjusting method provided by an embodiment of the present disclosure, acquiring a detection coordinate value of a white point of a display panel in work comprises: adjusting flicker of the display panel to a preset flicker range.

At least one embodiment of the present disclosure provides another adjusting method of a display panel, which comprises: acquiring a detection coordinate value of a white point of a display panel in work; acquiring a preset coordinate value and a permissible offset value of the white point; and determining a desired coordinate range according to the preset coordinate value and the permissible offset value; if the detection coordinate value is in the desired coordinate range, taking the detection coordinate value as a target coordinate value; if the detection coordinate value is located outside the desired coordinate range, determining the target coordinate value on the basis of a distance between the detection coordinate value and the desired coordinate range, adjusting the white point setting position according to the target coordinate value, checking whether the white point is located at the position where the target coordinate value is located, if the white point is not located at the position where the target coordinate value is located, adjusting the white point setting position according to the target coordinate value, and if the white point is located at the position where the target coordinate value is located, recording the adjusted white point setting position in the second storage location.

At least one embodiment of the present disclosure provides an adjusting apparatus of a display panel, which comprises: an acquisition module, a determination module and an adjustment module, the acquisition module is configured to acquire a detection coordinate value of a white point of a display panel in work; the determination module is configured to determine a target adjustment mode from at least two adjustment modes according to the detection coordinate value, the at least two adjustment modes comprise a first adjustment mode and a second adjustment mode; and the adjustment module is configured to adjust at least some of parameters of the display panel on the basis of the target adjustment mode, in which the parameters of the display panel comprise grayscale coefficient and white point setting position, adjusting the grayscale coefficient and taking the detection coordinate value as the white point setting position in the first adjustment mode, and adjusting the grayscale coefficient and adjusting the white point setting position according to the detection coordinate value in the second adjustment mode.

At least one embodiment of the present disclosure provides an adjusting method of a display panel, which comprises: acquiring a detection coordinate value of a white point of a display panel in work; acquiring a desired coordinate range of the white point; and determining a target coordinate value of the white point according to a relationship between the detection coordinate value and the desired coordinate range; and adjusting a white point setting position according to the target coordinate value so that the adjusted white point is located at the target coordinate value.

For example, in the adjusting method provided by an embodiment of the present disclosure, acquiring a desired coordinate range of the white point comprises: acquiring a preset coordinate value and a permissible offset value of the white point; and determining the desired coordinate range according to the preset coordinate value and the permissible offset value.

For example, in the adjusting method provided by an embodiment of the present disclosure, determining a target coordinate value of the white point according to a relationship between the detection coordinate value and the desired coordinate range comprises: determining a point within the desired coordinate range that is closest in distance to the detection coordinate value; and taking the coordinates of the closest point as the target coordinate value.

At least one embodiment of the present disclosure provides an electronic device, which comprises: a processor; and a memory, storing one or more computer program modules; in which the one or more computer program modules are configured to be executed by the processor to implement the adjusting method of the display panel according to any one of the embodiments mentioned above.

At least one embodiment of the present disclosure provides a computer-readable storage medium, which stores a non-transitory computer-readable instruction, the non-transitory computer-readable instruction being executed by a computer to implement the adjusting method of the display panel according to any one of the embodiments mentioned above.

BRIEF DESCRIPTION OF DRAWINGS

In order to illustrate the technical solutions of the embodiments of the present disclosure clearer, the drawings of the embodiments will be briefly described. Obviously, the drawings in the following only relate to some embodiments of the present disclosure, and are not intended to limit the present disclosure.

FIGS. 6D and 6E show schematic diagrams of data before and after adjusting white point coordinates using gamma-3;

FIG. 6F and FIG. 6G show schematic diagrams of distributions of another type of detection points;

DETAILED DESCRIPTION

Figure 1:
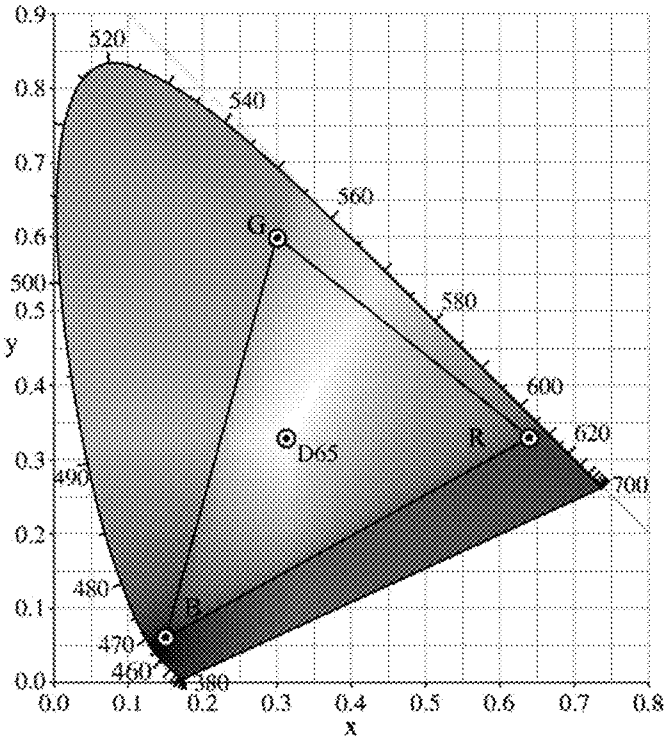
FIG. 1 shows a color gamut diagram about a display panel.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for invention, are not intended to indicate any sequence, amount or importance, but distinguish various components. Similarly, the terms "one" or "the" do not indicate a quantity limit, but rather indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Sensitivity of the human eye to an external light source is not linearly related to input light intensity. For example, at a low illuminance, it is easy for human eyes to distinguish luminance variation, and as the illuminance increases, it is not easy for the human eyes to distinguish the luminance variation. That is, the reaction of the human eyes to luminance increases nonlinearly. Therefore, the relationship between an input voltage determined by a display panel according to images and the final output luminance should also be nonlinear to adapt to the reaction of the human eyes to luminance, where Gamma (grayscale coefficient) may indicate the non-linear relationship between the luminance of the display panel and the input voltage. For example, Gamma 2.2 conforms to linear perception of the human eyes to the luminance, and accordingly a display screen that meets the Gamma 2.2±0.2 (error) may be considered as a qualified product. However, the display screen needs to go through a number of processes. Fluctuations brought about by each process may inevitably lead to Gamma not in the range of 2.2±0.2, so it is necessary to perform gamma adjustment on the display screen to ensure the gamma coefficient of the display screen remaining in the range of 2.2±0.2.

FIG. 1 shows a color gamut diagram about a display panel. R, G, and B shown in FIG. 1 represent three primary colors of red, green and blue, respectively. A white point D65 is located among the three primary colors, which is a target center of the RGB color space. A position of the white point D65 affects performance of the most part of colors of the display panel. The position of the white point D65 is jointly determined by parameter values (e.g., luminance) of the three primary colors RGB. The position of the white point D65 maybe adjusted by adjusting the luminance and other parameters of at least one of the three primary colors RGB, e.g., by reducing the luminance of one or more of the primary colors, and therefore, a certain amount of luminance loss will be caused during adjustment of the position of the white point.

In the process of adjusting optical characteristics of the display panel, it is necessary to adjust the gamma to a desired value (e.g., 2.2±0.2), and due to the different preferences of different groups, characteristics such as the white point and contrast of a display may be adjusted. For example, the white point coordinates maybe adjusted to be within a range of (0.303, 0.309)+0.02. Gamma adjustment may be divided into single-gamma adjustment and gamma-3 adjustment. In the single-gamma adjustment, the gamma coefficient rather than the white point coordinates is adjusted, so the luminance loss is small. In the gamma-3 adjustment, the gamma coefficient and the white point coordinates are adjusted at the same time. A large deviation of the white point coordinates will lead to a large luminance loss.

When adjusting the optical characteristics of the display panel, it is common to set only one fixed adjustment mode, i.e., the single-gamma adjustment or the gamma-3 adjustment, but both of these adjustment modes are flawed to some extent. Taking the production of VR (Virtual Reality) products as an example, it is necessary to adjust optical characteristics of the product, and gamma correction (i.e., adjustment) needs to be performed in the process, which is often set as the single-gamma adjustment to take into account the luminance. In the case that the single-gamma adjustment is selected, the white point coordinates of some products may deviate from the desired range of coordinates, resulting in yield loss and unstable performance. In the case that the gamma-3 adjustment mode is selected, the luminance loss in adjustment is large, resulting in that the luminance or contrast can not reach the expected effect. In order to ensure the product quality and improve the yield of factories, there is an urgent need for a solution that is compatible with the above two adjustment modes.

At least one embodiment of the present disclosure provides an adjusting method of a display panel, an adjusting apparatus of a display panel, an electronic device, and a computer-readable storage medium. The adjusting method of the display panel includes acquiring a detection coordinate value of a white point of a display panel in work; determining a target adjustment mode from at least two adjustment modes according to the detection coordinate value, where the at least two adjustment modes include a first adjustment mode and a second adjustment mode; and adjusting at least some of parameters of the display panel on the basis of the target adjustment mode, where the parameters of the display panel include grayscale coefficient and white point setting position, adjusting the grayscale coefficient and taking the detection coordinate value as the white point setting position in the first adjustment mode, and adjusting the grayscale coefficient and adjusting the white point setting position according to the detection coordinate value in the second adjustment mode.

By the adjusting method of the display panel, adjustment modes adapted to display panels may be determined according to different conditions of different display panels, automatic selection and setting of the adjustment modes may be implemented, and thus advantages of various adjustment modes may be achieved simultaneously while defects of the single adjustment mode is overcome.

Figure 2:
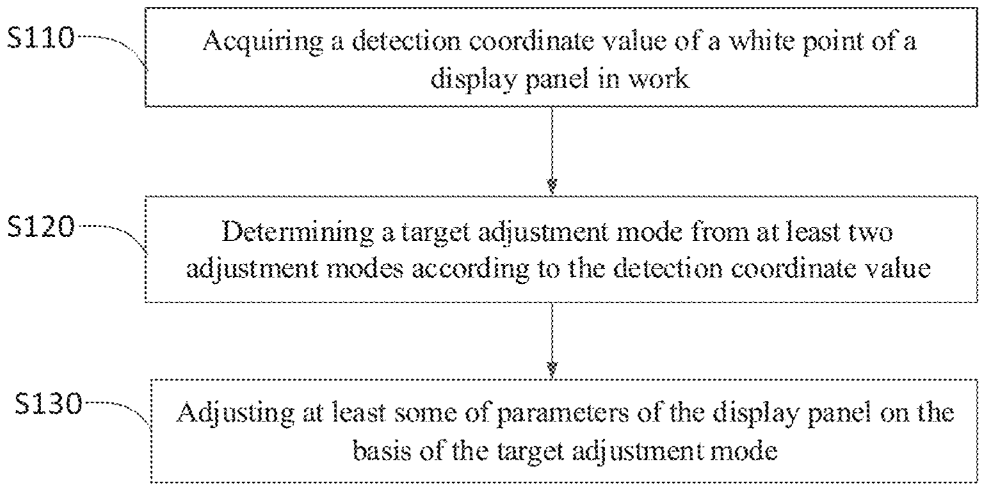
FIG. 2 shows a flowchart of an adjusting method of a display panel according to at least one embodiment of the present disclosure.

FIG. 2 shows a flowchart of an adjusting method of a display panel according to at least one embodiment of the present disclosure.

As shown in FIG. 2, the adjusting method may include steps S110-S130.

Step S110: acquiring a detection coordinate value of a white point of a display panel in work.

Step S120: determining a target adjustment mode from at least two adjustment modes according to the detection coordinate value. For example, the at least two adjustment modes include a first adjustment mode and a second adjustment mode.

Step S130: adjusting at least some of parameters of the display panel on the basis of the target adjustment mode. For example, the parameters of the display panel include grayscale coefficient and white point setting position (hereinafter also referred to as setting position of the white point), adjusting the grayscale coefficient and taking the detection coordinate value as the white point setting position in the first adjustment mode, and adjusting the grayscale coefficient and adjusting the white point setting position according to the detection coordinate value in the second adjustment mode.

For example, in the adjusting method according to an embodiment of the present disclosure, S110 may include adjusting backlight luminance of the display panel to a preset luminance range; and determining the detection coordinate value of the white point on the basis of collected optical information of a white screen of the display panel.

For example, before detecting the actual position of the white point, the display panel may be adjusted to a desired state to make a detection result more accurate, such as by adjusting backlight of the display panel to a suitable luminance range, or by adjusting backlight luminance to a permissible maximum luminance. In addition, in some embodiments, flicker (Flicker, or FLK) of the display panel may also be adjusted to a preset flicker range, for example, the flicker is adjusted to a lowest flicker permissible for the display panel, so that the screen does not jitter or jitters less during the detection.

For example, after the display panel is adjusted to the desired state, the position of the white point may be detected, for example, optical information of the white screen may be collected by means of an optical probe, the optical information includes luminance and color coordinates, the color coordinates of the white screen may be used as the detection coordinate value of the white point, and the luminance information may be used for other purposes. The white screen may be understood as a screen at a highest grayscale. In some embodiments, in addition to collecting the optical information of the white screen, optical information of a plurality of other white points may also be collected. The plurality of white points represent screens at a plurality of grayscales, i.e., the luminance and color coordinates at a plurality of different grayscales are acquired for other purposes.

Figure 3:
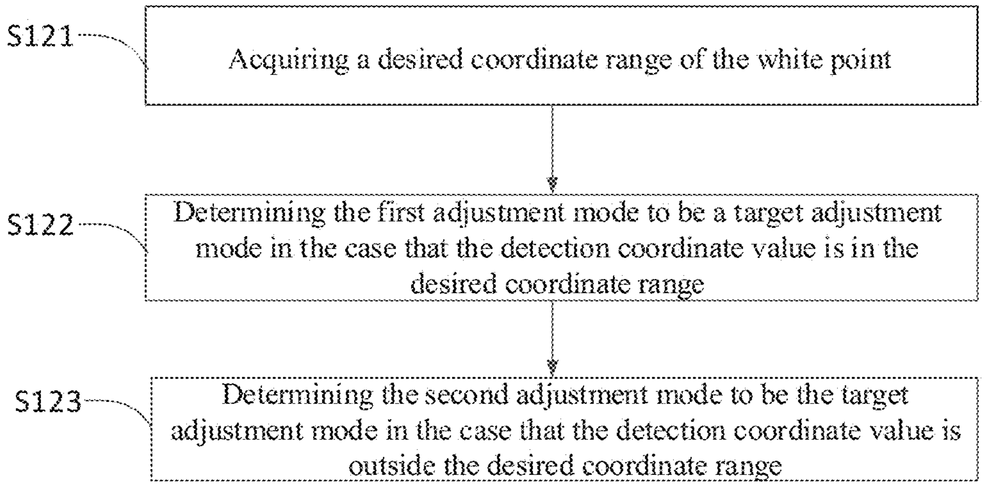
FIG. 3 shows a flowchart of an adjusting method of a display panel according to at least one embodiment of the present disclosure.

FIG. 3 shows a flowchart of an adjusting method of a display panel according to at least one embodiment of the present disclosure. As shown in FIG. 3, for example, in the adjusting method according to an embodiment of the present disclosure, step S120 may include steps S121-S123.

Step S121: acquiring a desired coordinate range of the white point.

Step S122: determining the first adjustment mode to be a target adjustment mode in the case that the detection coordinate value is in the desired coordinate range.

Step S123: determining the second adjustment mode to be the target adjustment mode in the case that the detection coordinate value is outside the desired coordinate range.

For example, the coordinates described in embodiments of the present disclosure are coordinates within a color gamut space, the color gamut space being, for example, the color gamut space CIE 1931.

Figure 4:
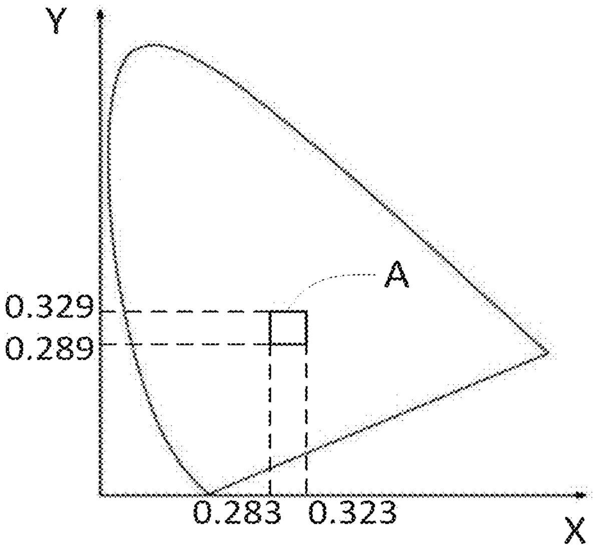
FIG. 4 shows a schematic diagram of a desired coordinate range according to at least one embodiment of the present disclosure.

For example, in step S121, a preset coordinate value and a permissible offset value of the white point may be acquired, and then the desired coordinate range may be determined according to the preset coordinate value and the permissible offset value. The preset coordinate value may be a desired position of the white point. If the preset coordinate value is (X0, Y0) and the permissible offset value is, for example, d, then the desired coordinate range is (X0, Y0)+d, and the desired coordinate range is [X0−d, X0+d] on the X-axis and is [Y0−d, Y0+d] on the Y-axis, where X0, Y0, and d are all values greater than zero. FIG. 4 shows a schematic diagram of a desired coordinate range according to at least one embodiment of the present disclosure. As shown in FIG. 4, if the preset coordinate value is (0.303, 0.309) and the permissible offset value is 0.025, the desired coordinate range A is (0.303, 0.309)±0.02, i.e., the desired coordinate range is [0.283, 0.323] on the X-axis, and the desired coordinate range is [0.289, 0.329] on the Y-axis.

For example, if the detection coordinate value of the white point is located within the desired coordinate range, the first adjustment mode is adopted, and there is no need to adjust the position of the white point, so that the detection coordinate value of the white point may be directly taken as the setting position of the white point, and only the grayscale coefficient needs to be adjusted. For example, the grayscale coefficient indicates a relationship between the input voltage and the luminance of the display panel, and the grayscale coefficient may be the gamma coefficient described above, for example, the gamma coefficient may be adjusted to be within the range of 2.2±0.2.

For example, if the detection coordinate value of the white point is located within the desired coordinate range, the second adjustment mode is adopted, the white point position needs to be adjusted, and the grayscale coefficient needs to be adjusted. During adjustment, the grayscale coefficient is adjusted before the position of the white point is adjusted. During adjustment of the position of the white point, the setting position of the white point may be adjusted according to the current detection coordinate value. In other embodiments, the position of the white point may be adjusted before the grayscale coefficient is adjusted.

In the adjusting method of the embodiments of the present disclosure, the detection coordinate value of the white point is acquired first, and then it is determined whether to adjust the grayscale coefficient only or to adjust the grayscale coefficient and the position of the white point at the same time according to the detection coordinate value of the white point. On the basis of this approach, adjustment modes adapted to display panels may be determined according to different conditions of different display panels, automatic selection and setting of the adjustment modes may be implemented, and thus advantages of various adjustment modes may be achieved simultaneously while defects of the single adjustment mode is overcome.

In the adjusting method of the embodiments of the present disclosure, the desired coordinate range of the white point is set, and the position of the white point is considered to meet the requirements when the position of the white point is located within this coordinate range. Compared to the method in the related art in which the position of the white point is considered to meet the requirements only when the position of the white point is located at a desired coordinate point, the adjusting method of the embodiments of the present disclosure has the advantages of reducing the adjustment of the position of the white point, decreasing the adjustment amplitude of the position of the white point, and reducing the luminance loss.

In the adjusting method of the embodiments of the present disclosure, the adjustment mode may be selected according to whether the detection coordinate value of the white point is located within the desired coordinate range. If the detection coordinate value of the white point is located within the desired coordinate range, only the grayscale coefficient is adjusted. If the detection coordinate value of the white point is located outside of the desired coordinate range, the grayscale coefficient and the position of the white point are adjusted. On the basis of this approach, on the one hand, it can be ensured that both the position of the white point and the grayscale coefficient meet the requirements, and on the other hand, when it is found that there is no need to adjust the position of the white point, the position of the white point is no longer changed, thus avoiding the luminance loss.

For example, step S130 may include: in the second adjustment mode, determining a target coordinate value of the white point according to the detection coordinate value, where the target coordinate value is in the desired coordinate range; and adjusting the white point setting position according to the target coordinate value so that the adjusted white point setting position is located at the target coordinate value. On the basis of this approach, the setting position of the white point may be adjusted to be within the desired coordinate range so as to meet requirements.

For example, in the process of determining the target coordinate value, a point within the desired coordinate range that is closest to the detection coordinate value may be determined, and the coordinates of the closest point are taken as the target coordinate value. For example, the luminance loss has a relationship with the adjustment amplitude of the position of the white point, for example, a positive correlation, i.e., the larger the adjustment amplitude of the position of the white point, the larger the luminance loss caused, and the smaller the adjustment amplitude of the position of the white point, the smaller the luminance loss caused. Since the point within the desired coordinate range that is closest to the detection coordinate value is taken as the target coordinate point, the adjustment amplitude of the position of the white point may be minimized, thus greatly reducing the luminance loss.

For example, in the adjusting method according to an embodiment of the present disclosure, the desired coordinate range is from a first boundary coordinate to a second boundary coordinate in a first direction, the first boundary coordinate being smaller than the second boundary coordinate; the desired coordinate range is from a third boundary coordinate to a fourth boundary coordinate in a second direction, the third boundary coordinate being smaller than the fourth boundary coordinate. For example, the first direction may be a horizontal coordinate direction. In the following embodiments, the first boundary coordinate may also be referred to as a first horizontal coordinate, the second boundary coordinate may also be referred to as a second horizontal coordinate, and the first horizontal coordinate and the second horizontal coordinate are, for example, X0−d and X0+d, respectively, as described above. The second direction may be a vertical coordinate direction. In the following embodiments, the third boundary coordinate may also be referred to as a first vertical coordinate, the fourth boundary coordinate may also be referred to as a second vertical coordinate, and the first vertical coordinate and the second vertical coordinate are, for example, Y0−d and Y0+d, respectively, as described above.

For example, the detection coordinate value includes a first detection coordinate and a second detection coordinate. The first detection coordinate is a coordinate in the first direction (e.g., the horizontal coordinate direction), and the second detection coordinate is a coordinate in the second direction (e.g., the horizontal coordinate direction). In the following embodiments, the first detection coordinate is also referred to as a horizontal coordinate detection value, the first detection coordinate is also referred to as a vertical coordinate detection value, and the horizontal coordinate detection value and the vertical coordinate detection value are, for example, denoted by Wx and Wy, respectively, where both Wx and Wy are values greater than 0.

For example, if the horizontal coordinate detection value Wx is in the desired coordinate range and the vertical coordinate detection value Wy is greater than the second vertical coordinate Y0+d, the horizontal coordinate detection value Wx and the second vertical coordinate Y0+d are taken as the target coordinate value. If the horizontal coordinate detection value Wx is in the desired coordinate range and the vertical coordinate detection value Wy is less than the first vertical coordinate Y0−d, the horizontal coordinate detection value Wx and the first vertical coordinate Y0−d are taken as the target coordinate value. If the vertical coordinate detection value Wy is in the desired coordinate range and the horizontal coordinate detection value Wx is greater than the second horizontal coordinate X0+d, the second horizontal coordinate X0+d and the vertical coordinate detection value Wy are taken as the target coordinate value. If the vertical coordinate detection value Wy is in the desired coordinate range and the horizontal coordinate detection value Wx is less than the first horizontal coordinate X0−d, the first horizontal coordinate X0−d and the vertical coordinate detection value Wy are taken as the target coordinate value.

Figure 5:
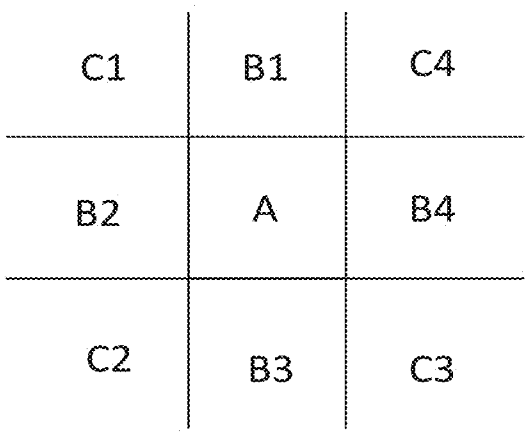
FIG. 5 shows a schematic diagram of coordinate division according to at least one embodiment of the present disclosure.

FIG. 5 shows a schematic diagram of coordinate division according to at least one embodiment of the present disclosure. As shown in FIG. 5, the coordinates may be divided into region A, region B (including B1, B2, B3 and B4) and region C (including C1, C2, C3 and C4). The region A is the desired coordinate range, and one of the X-coordinate range and Y-coordinate range of the region B is the same as that of the region A, while the others are different. The region C has both an X-coordinate range and a Y-coordinate range that are different from the region A. The coordinate ranges of B1, B2, B3, B4, C1, C2, C3, and C4 are, for example:

- the X-coordinate range of region B1 is, for example, [X0−d, X0+d], and the Y-coordinate range of the region B1 is, for example, greater than Y0+d;
- the X-coordinate range of region B2 is, for example [0, X0−d), and the Y-coordinate range of the region B2 is for example [Y0−d, Y0+d];
- the X-coordinate range of region B3 is, for example, [X0−d, X0+d], and the Y-coordinate range of the region B3 is, for example, [0, Y0−d);
- the X-coordinate range of region B4 is, for example, greater than X0+d, and the Y-coordinate range of the region B4 is, for example, [Y0−d, Y0+d];
- the X-coordinate range of region C1 is, for example, [0, X0−d), and the Y-coordinate range of the region C1 is, for example, greater than Y0+d;
- the X-coordinate range of region C2 is, for example, [0, X0−d), and the Y-coordinate range of the region C2 is, for example, [0, Y0−d);
- the X-coordinate range of region C3 is, for example, greater than X0+d, and the Y-coordinate range of the region C3 is, for example, [0, Y0−d); and
- the X-coordinate range of region C4 is, for example, greater than X0+d and the Y-coordinate range of the region C4 is, for example, greater than Y0+d.

For example, if the detection coordinate value of the white point is located in the region A, i.e., Wx is located in the range [X0−d, X0+d] and Wy is located in the range [Y0−d, Y0+d], then only the gamma coefficient needs to be adjusted.

For example, if the detection coordinate value of the white point is located in the region B, i.e., only one of Wx and Wy is within the desired coordinate range, then the white point coordinates and the gamma coefficient need to be adjusted. Only one coordinate (X coordinate or Y coordinate) needs to be adjusted during adjustment of the white point coordinates, so as to reduce the luminance loss.

For example, if the detection coordinate value of the white point is located in the region B1, Wx is within the orientation of the interval X0±d, and Wy>Y0+d, then the target coordinate value of the white point may be set as (Wx, Y0+d), i.e., the white point may be adjusted to (Wx, Y0+d).

For example, if the detection coordinate value of the white point is located in the region B2, Wy is within the orientation of the interval Y0+d, and Wx<X0−d, then the target coordinate value of the white point may be set as (X0−d, Wx), i.e., the white point may be adjusted to (X0−d, Wx).

For example, if the detection coordinate value of the white point is located in the region B3, Wx is within the orientation of the interval X0+d, and Wy<Y0−0.02, then the target coordinate value of the white point may be set as (Wx, Y0−d).

For example, if the detection coordinate value of the white point is located in the region B4, Wy is within the orientation of the interval Y0+d, and Wx>X0+0.02, then the target coordinate value of the white point may be set as (X0+d, Wx).

For example, if the horizontal coordinate detection value is greater than the second horizontal coordinate and the vertical coordinate detection value is greater than the second vertical coordinate, the second horizontal coordinate and the second vertical coordinate are taken as the target coordinate value; if the horizontal coordinate detection value is less than the first horizontal coordinate and the vertical coordinate detection value is less than the first vertical coordinate, the first horizontal coordinate and the first vertical coordinate are taken as the target coordinate value; if the horizontal coordinate detection value is greater than the second horizontal coordinate and the vertical coordinate detection value is less than the first vertical coordinate, the second horizontal coordinate and the first vertical coordinate are taken as the target coordinate value; if the horizontal coordinate detection value is smaller than the first horizontal coordinate and the vertical coordinate detection value is larger than the second vertical coordinate, the first horizontal coordinate and the second vertical coordinate are taken as the target coordinate value.

For example, if the detection coordinate value of the white point is located in the region C, i.e., both Wx and Wy are not in the desired coordinate range, then both the white point coordinates and the gamma coefficient need to be adjusted. The X coordinate and Y coordinate need to be adjusted during adjustment of the white point coordinates.

For example, if the detection coordinate value of the white point is located in the region C1, Wx<X0−d and Wy>Y0+d, then the target coordinate value of the white point may be set as (X0−d, Y0+d).

For example, if the detection coordinate value of the white point is located in the region C2, Wx<X0−d, and Wy<Y0−d, then the target coordinate value of the white point may be set as (X0−d, Y0−d).

For example, if the detection coordinate value of the white point is located in the region C3, where Wx>X0+d and Wy>Y0−d, then the target coordinate value of the white point may be set as (X0+d, Y0−d).

For example, if the detection coordinate value of the white point is located in the region C4, Wx>X0+d and Wy>Y0+d, then the target coordinate value of the white point may be set as (X0+d, Y0+d).

For example, after the target coordinate value is acquired, the setting position of the white point is adjusted so that the adjusted setting position of the white point is located at the target coordinate value. For example, the position of the white point is jointly determined by parameter values (e.g., luminance) of the three primary colors RGB. The position of the white point D65 may be adjusted by adjusting the luminance and other parameters of at least one of the three primary colors RGB, e.g., by reducing the luminance of one or more of the primary colors.

For example, the adjusting method according to an embodiment of the present disclosure may further include: after adjusting at least some of the parameters of the display panel, recording the acquired grayscale coefficient in a first storage location and recording the acquired white point setting position in a second storage location. For example, if the target adjustment mode is the first adjustment mode, the adjusted gamma coefficient is recorded in the first storage location, and the detection coordinate value is recorded in the second storage location as the setting position of the white point. If the target adjustment mode is the second adjustment mode, the adjusted grayscale coefficient is recorded in the first storage location, and the adjusted setting position of the white point is recorded in the second storage location.

For example, the storage device associated with the display panel includes a plurality of registers, and some of the registers are configured to record the gamma coefficient and the position of the white point, for example, the registers numbered C7, C8, and C9 are gamma registers. Value of the gamma coefficient may be changed by rewriting C7, and the setting position of the white point, i.e., the white point coordinate value, may be changed by rewriting C8 and C9. The first storage location is, for example, the register C7, and the second storage location is, for example, the registers C8 and C9. In the first adjustment mode, since only the gamma coefficient is adjusted and the white point coordinates are not adjusted, it is necessary to rewrite the register C7 after adjustment, for example, to rewrite the gamma coefficient in the register C7 to 2.2 while the registers C8 and C9 are not rewritten. In the second adjustment mode, the gamma coefficient and the white point coordinates are adjusted at the same time, so the register C7 needs to be rewritten after adjustment. For example, the gamma coefficient in the register C7 is rewritten to 2.2, and the registers C8/C9 also needs to be rewritten, for example, the white point coordinates in the registers C8/C9 are rewritten to the target coordinate value of the white point. In the case of using the fixed gamma-3 adjustment mode in the related art, if the position of the white point is changed, the zero bit of the register C8 is 01 (default 00), and bits 2 to 5 are variation values. When using the adjusting method of the embodiments of the present disclosure, if the position of the white point is changed, the zero bit of the register C8 is 01 (default 00), bits 2 to 4 are variation values, and bit 5 is the default value FF. Therefore, whether or not the white point coordinates are adjusted may be determined by reading back the zero bit of the product C8 as 00 or 01. Moreover, the adjustment mode maybe recognized by the readback of bit 5, which is the conventional gamma-3 adjustment when bit 5 is a variation value, and which is the adjustment mode of this embodiment of the present disclosure when bit 5 is a fixed value.

For example, the adjusting method may include checking whether the adjusted white point setting position is located at the target coordinate value after adjusting the white point setting position; and if the adjusted white point setting position is located at the target coordinate value, recording the adjusted white point setting position in the second storage location. In other words, the corresponding registers are rewritten after it is ensured that the setting position of the white point after adjustment of the white point is located at the target coordinate value.

Figure 6A:
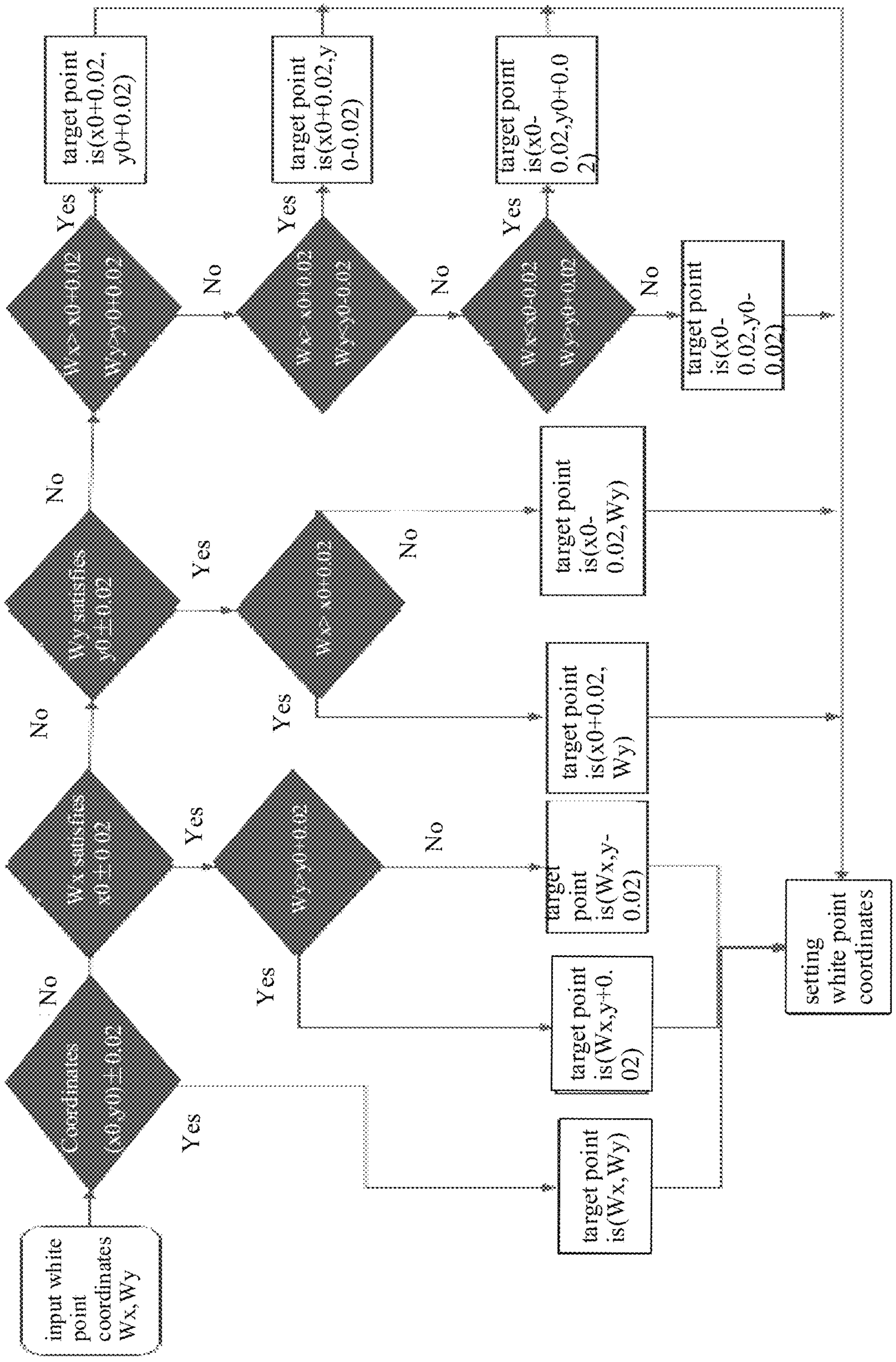
FIG. 6A shows a schematic diagram of an adjustment process according to at least one embodiment of the present disclosure.

FIG. 6A shows a schematic diagram of an adjustment process according to at least one embodiment of the present disclosure. As shown in FIG. 6A, the white point coordinates (i.e., the detection coordinate value) Wx and Wy may be input to a processor. Taking d=0.02 as an example, the processor may determine whether Wx and Wy are located within the range of (X0, Y0)±0.02. If they are located within the range of (X0, Y0)±0.02, a target point (i.e., the target coordinate value of the white point) is set as (Wx, Wy). If they lie outside the range of (X0, Y0)±0.02, the processor further determines whether Wx satisfies X0±0.02, and if Wx satisfies X0±0.02, it further determines whether Wy is greater than Y0+0.02. If Wy is greater than Y0+0.02, then the target point is (Wx, Y0+0.02), and if Wy is not greater than Y0+0.02, then the target point is (Wx, Y0−0.02). If Wx does not satisfy X0±0.02, then the processor further determines whether Wy satisfies Y0±0.02, if Wy satisfies Y0±0.02, then it determines whether Wx is greater than X0+0.02. If Wx is greater than X0+0.02, then the target point is (X0+0.02, Wy), and if Wx is not greater than X0+0.02, then the target point is (X0−0.02, Wy). If Wy also does not satisfy Y0+0.02, then the processor further determines whether Wx is greater than X0+0.02 and whether Wy is greater than Y0+0.02. If Wx is greater than X0+0.02 and Wy is greater than Y0+0.02, then the target point is (X0+0.02, Y0+0.02); if Wx is greater than X0+0.02 and Wy is less than Y0−0.02, then the target point is (X0+0.02, Y0−0.02); if Wx is less than X0−0.02 and Wy is greater than Y0+0.02, then the target point is (X0−0.02, Y0+0.02); and if Wx is less than X0−0.02 and Wy is less than Y0+0.02, then the target point is (X0−0.02, Y0−0.02). After the target point is obtained by any of the above processes, the white point coordinates are set as the target point.

The adjusting method of the display panel of the embodiments of the present disclosure is described above, and effects of the adjusting method will be described below with data.

Figure 6B:
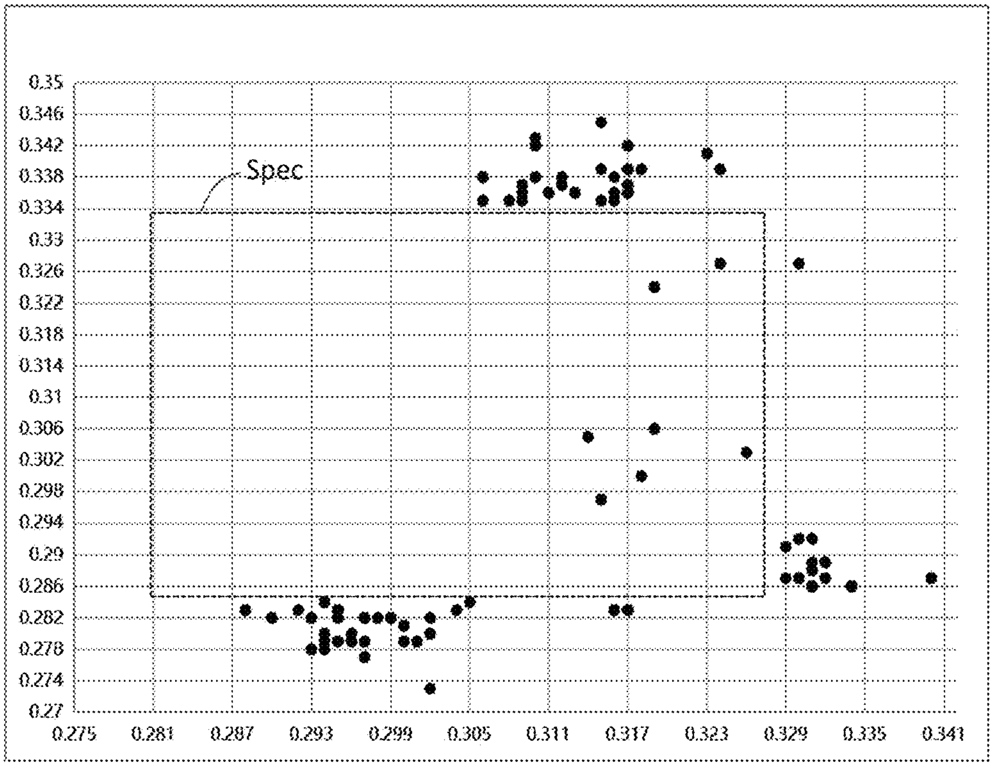
FIG. 6B shows a schematic diagram of distribution of one type of detection points.

FIG. 6B shows a schematic diagram of distribution of one type of detection points. As shown in FIG. 6B, Spec represents the desired coordinate range, and the surrounding black dots represent a plurality of white point detection coordinate values (hereinafter referred to as detection points) collected for a plurality of display panel products. FIG. 6B shows a distribution diagram obtained by summarizing the white points of the plurality of display panel products. Each of the black dots may be used to represent a white point of one product. As shown in FIG. 6B, some of the detection points are located within the Spec range and some of the detection points are located outside the Spec range, in which case, if the single-gamma adjustment mode is adopted, the setting is to adjust the grayscale coefficient only without adjusting the position of the white point. Since the white point of some products is located outside the specification range (Spec range), the color display of these products is poor and cannot meet the color requirements, and accordingly the products are defective products.

Figure 6C:
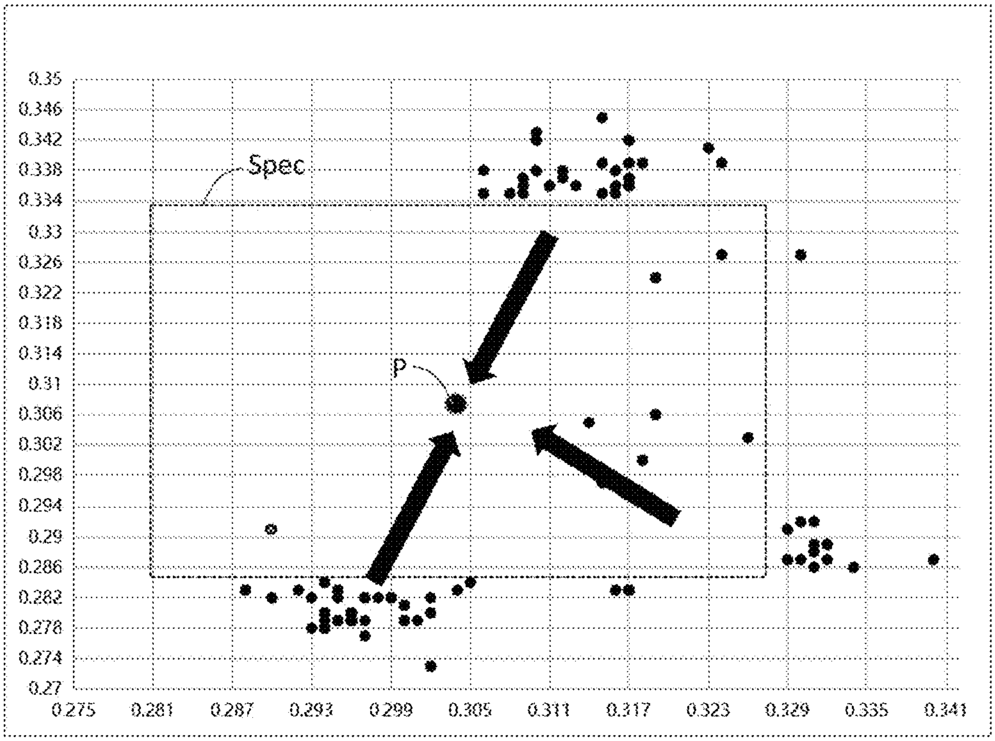
FIG. 6C shows a schematic diagram of distribution of another type of detection points.

FIG. 6C shows a schematic diagram of distribution of another type of detection points. As shown in FIG. 6C, if the gamma-3 adjustment mode is adopted, each detection point needs to be adjusted to the white point set value P, which is, for example, (0.303, 0.309). Since the white point needs to be adjusted to a preset position in the gamma-3 adjustment mode, the distance between the white point detection value and this preset position is large, and the adjustment amplitude of the white point position is large, which causes a large luminance loss.

Figures 6E, 6F:
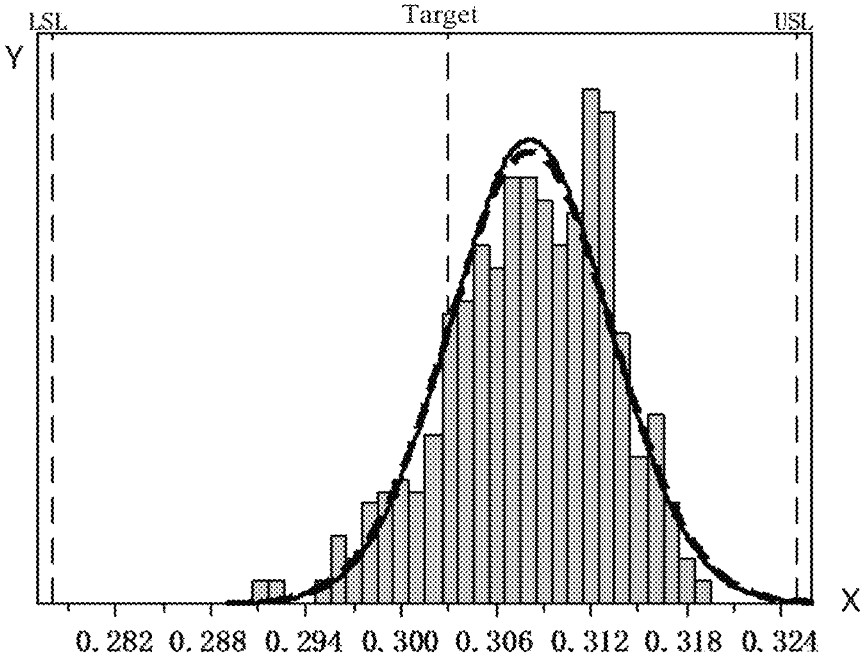

FIGS. 6D and 6E show schematic diagrams of data before and after adjusting the white point coordinates using gamma-3. FIG. 6D shows the data before and after adjusting the horizontal coordinates. FIG. 6E shows the data before and after adjusting the vertical coordinate as in FIG. 6D. The detection coordinate value of the white point is (0.315, 0.323). Since this detection coordinate value has a deviation from the white point set value (0.303, 0.309), it is necessary to adjust this detection coordinate value to be as close as possible to (0.303, 0.309). For example, the horizontal coordinate Wx is adjusted first while keeping the vertical coordinate Wy unchanged, and after a number of adjustments (e.g., 12), the horizontal coordinate is gradually adjusted from 0.315 to 0.302, so that the horizontal coordinate is changed by 0.013, the vertical coordinate fluctuates from 0.323 to 0.320, and the luminance Lv is reduced from 415 nit to 394 nit, with a decrease in luminance of 23 nit. Referring again to FIG. 6E, the vertical coordinate Wy is further adjusted on the basis of (0.302, 3.320). After several adjustments, the vertical coordinate is gradually adjusted from 0.320 to 0.286, the horizontal coordinate is changed by 0.034, the horizontal coordinate is fluctuated from 0.02 to 0.305, and the luminance Lv is reduced from 394 nit to 321 nit with a decrease in luminance of 73 nit. Therefore, by adjusting Wx and Wy, the luminance is reduced by a total of 96 nit, which is a large decrease.

Figure 6G:
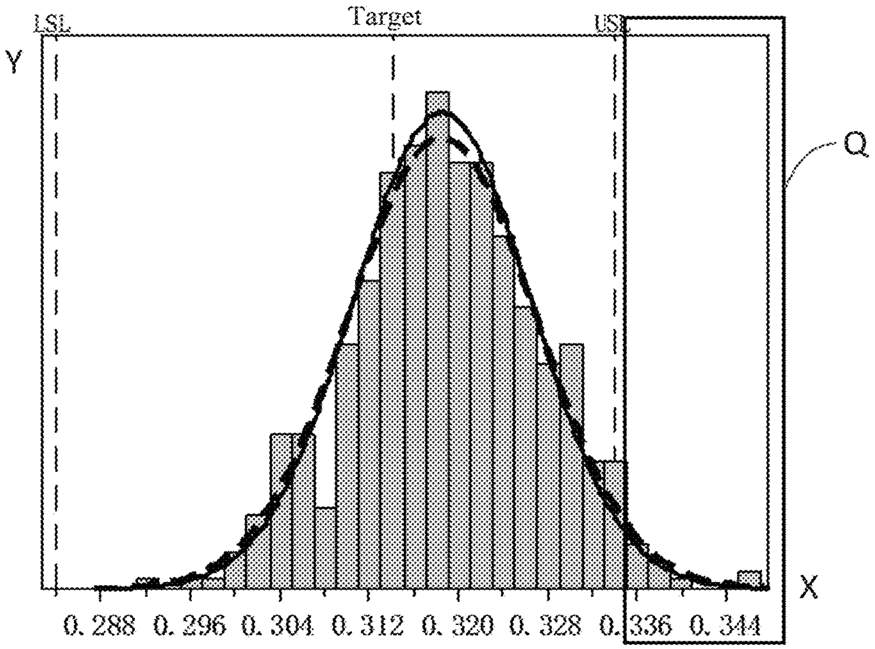

FIG. 6F and FIG. 6G show schematic diagrams of distributions of another type of detection points. FIG. 6F shows a horizontal coordinate distribution of the detection points. FIG. 6G shows a vertical coordinate distribution of the detection points. The distributions shown in FIGS. 6F and 6G are obtained by summarizing the white points of a plurality of display panel products. Taking the horizontal coordinate distribution as an example, the X-axis of a histogram shown in FIG. 6F indicates the horizontal coordinates of the detection points, each bar graph corresponds to a horizontal coordinate interval, and the Y-axis of the histogram indicates the proportion of the number of products within each horizontal coordinate interval to the total number of products, and the same is true for the vertical coordinate distribution shown in FIG. 6G. In FIG. 6F, the dotted line corresponding to "Target" indicates the horizontal coordinate of the white point set value, for example, 0.303; the dotted line corresponding to "LSL" indicates the minimum horizontal coordinate of the desired coordinate range, and the dotted line corresponding to "USL" indicates the maximum horizontal coordinate of the desired coordinate range. As shown in FIG. 6F, the horizontal coordinate of each white point is in the desired coordinate range. In FIG. 6G, the dotted line corresponding to "Target" indicates the vertical coordinate of the white point setting value, for example, 0.309; the dotted line corresponding to "LSL" indicates the minimum vertical coordinate of the desired coordinate range, and the dotted line corresponding to "USL" indicates the maximum vertical coordinate of the desired coordinate range. As shown in FIG. 6G, the vertical coordinates of some of the white points exceed the desired coordinate range, for example, the vertical coordinates of some white points within box Q exceed the desired coordinate range. According to the adjusting method of the embodiments of the present disclosure, the vertical coordinates of some of the white points that are out of the desired coordinate range need to be adjusted so that all of the vertical coordinates of white points of this part of products are adjusted to be within the desired coordinate range. Since the horizontal coordinates satisfy the requirements, the horizontal coordinates maybe maintained unchanged.

Figure 6H:
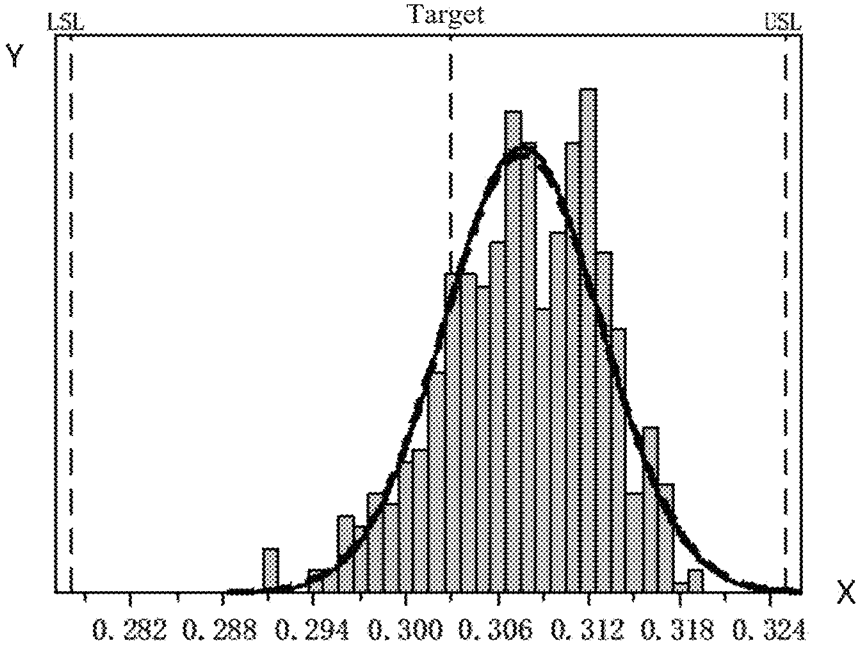
FIG. 6H and FIG. 6I show schematic diagrams of distributions before and after adjusting white point coordinates by the adjusting method of embodiments of the present disclosure.
Figure 6I:
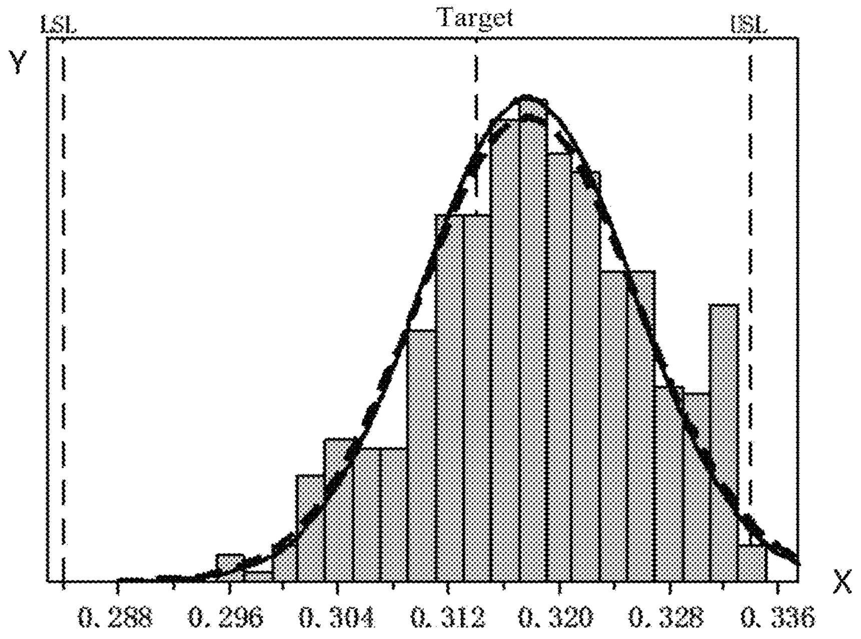

FIG. 6H and FIG. 6I show schematic diagrams of distributions before and after adjusting white point coordinates by the adjusting method of embodiments of the present disclosure. FIG. 6H shows distribution of horizontal coordinates after adjustment. FIG. 6I shows distribution of vertical coordinates after adjustment. As shown in FIG. 6G and FIG. 6I, by the adjusting method of the embodiments of the present disclosure, the vertical coordinates of some of white points that are out of the desired coordinate range are adjusted to be within the desired coordinate range. As shown in FIG. 6F and FIG. 6H, since only the vertical coordinates are adjusted, the distribution of the horizontal coordinates essentially remains unchanged, with only small fluctuations. For example, the vertical coordinate average value in the distribution of vertical coordinates shown in FIG. 6G is 0.3184, the vertical coordinate average value in the distribution of vertical coordinates shown in FIG. 6I is 0.3177, and the average change in the vertical coordinates before and after the adjustment is 0.0008. For example, the horizontal coordinate average value in the distribution of horizontal coordinates shown in FIG. 6F is 0.3081, the horizontal coordinate average value in the distribution of horizontal coordinates shown in FIG. 6F is 0.3076, and the average fluctuation in the horizontal coordinates before and after the adjustment is 0.0005.

Figure 6J:
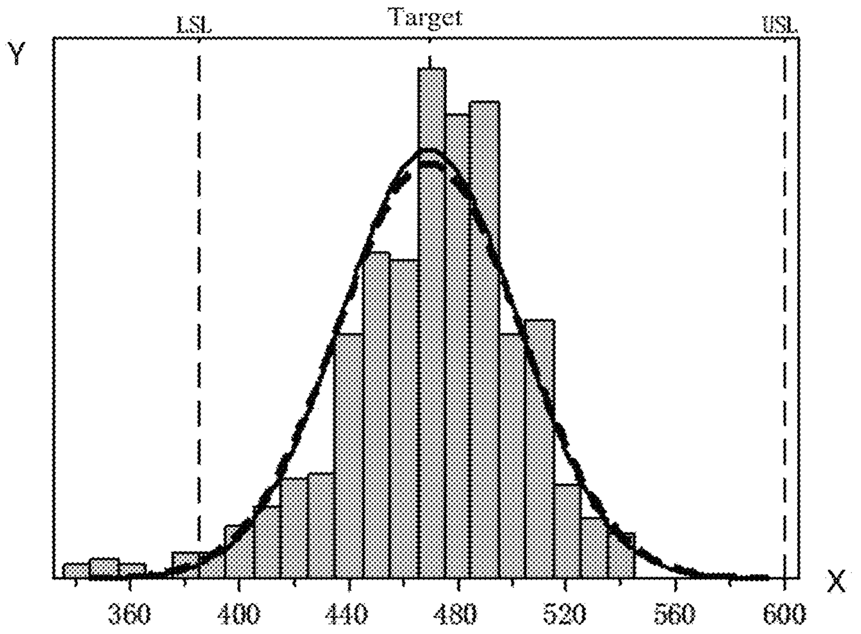
FIGS. 6J and 6K show schematic diagrams of luminance before and after adjusting white point coordinates by the adjusting method of embodiments of the present disclosure.
Figure 6K:
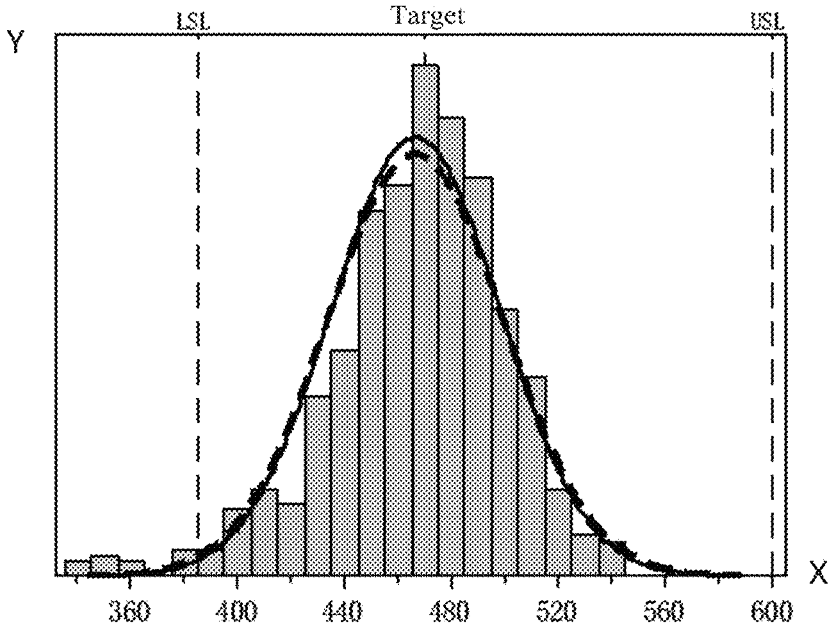

FIGS. 6J and 6K show schematic diagrams of luminance before and after adjusting white point coordinates by the adjusting method of embodiments of the present disclosure. FIG. 6J shows a luminance distribution before adjustment, corresponding to the detection point distribution shown in FIGS. 6F and 6G. The X-axis of a histogram shown in FIG. 6J indicates luminance, each bar corresponds to a luminance interval, the Y-axis of the histogram indicates the number of products corresponding to each luminance interval as a percentage of the total number of products, and FIG. 6K shows a luminance distribution after adjustment. As shown in FIG. 6J and FIG. 6K, the luminance basically does not change before and after adjustment, and the luminance loss is small. For example, the luminance average value in the luminance distribution shown in FIG. 6J is 469.389 nit, the luminance average value in the luminance distribution shown in FIG. 6K is 466.469 nit, and the average change in luminance is 2.92 nit. Compared to the gamma-3 adjustment mode shown in FIGS. 6C to 6E, the adjusting method of the embodiments of the present disclosure results in a significant decrease in luminance reduction and a substantial decrease in luminance loss. Compared to the single-gamma adjustment mode shown in FIG. 6B, the adjusting method of the embodiments of the present disclosure adjusts white points of products that do not conform to the desired coordinate range, and adjusts their white points to the desired coordinate range, so that the products meet the color requirements, and defective products are avoided or reduced.

An embodiment of the present disclosure proposes a method of selecting a gamma adjustment mode and dynamically calculating white point coordinates. By the way of dynamically selecting the gamma adjustment mode and dynamically finding the optimal white point coordinates, the product luminance loss is minimized while the white point coordinates are adjusted to be within the desired range.

The adjusting method of the embodiments of the present disclosure overcomes the defect that only one gamma adjustment mode, i.e., single-gamma adjustment or gamma-3 adjustment, may be set in the conventional art, and realizes automatic mode setting. The adjusting method of the embodiments of the present disclosure provides the desired coordinate range of the white point, solves the problem that only one fixed desired white point coordinate is set in the related art, and reduces the luminance loss in the gamma-3 adjustment. Therefore, the problems of large color gamut of products, yield loss of single mode and efficiency loss in gamma adjustment are solved.

At least one embodiment of the present disclosure further provides another adjusting method of a display panel. FIG.

7A shows a flowchart of another adjusting method of a display panel according to at least one embodiment of the present disclosure.

Figure 7A:
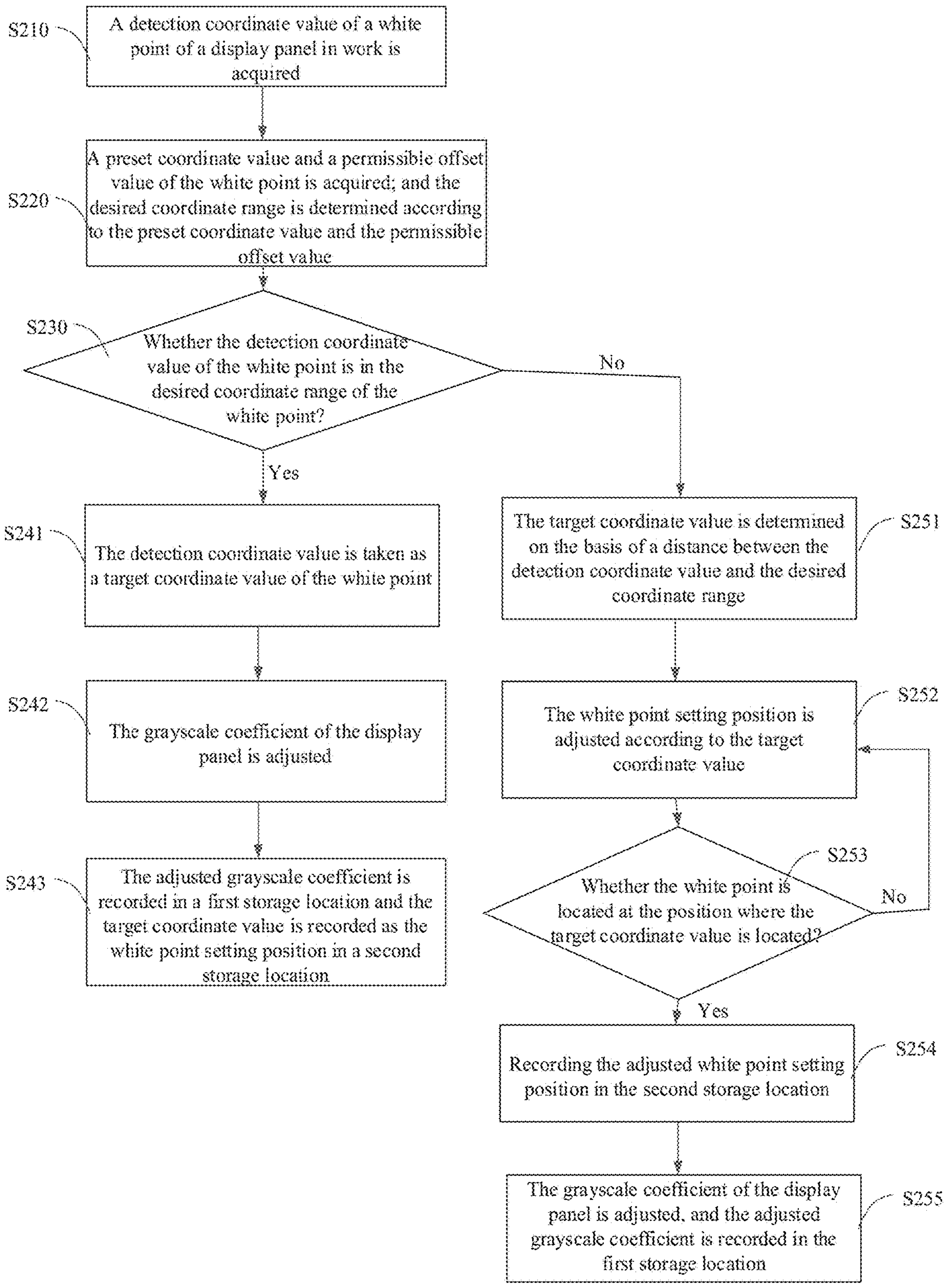
FIG. 7A shows a flowchart of another adjusting method of a display panel according to at least one embodiment of the present disclosure.

As shown in FIG. 7A, the adjusting method includes the following steps.

A detection coordinate value of a white point of a display panel in work is acquired (step S210). The detection coordinate value includes a horizontal coordinate detection value and a vertical coordinate detection value.

A preset coordinate value and a permissible offset value of the white point is acquired; and the desired coordinate range is determined according to the preset coordinate value and the permissible offset value (step S220). For example, the desired coordinate range is from a first horizontal coordinate to a second horizontal coordinate and from a first vertical coordinate to a second vertical coordinate, the first horizontal coordinate is less than the second horizontal coordinate and the first vertical coordinate is less than the second vertical coordinate.

It is determined whether the detection coordinate value of the white point is in the desired coordinate range of the white point (step S230).

If the detection coordinate value is in the desired coordinate range, the detection coordinate value is taken as a target coordinate value of the white point (step S241); the grayscale coefficient of the display panel may also be adjusted (step S242); the adjusted grayscale coefficient is recorded in a first storage location and the target coordinate value is recorded as the white point setting position in a second storage location (step S243).

If the detection coordinate value is located outside the desired coordinate range, the target coordinate value is determined on the basis of a distance between the detection coordinate value and the desired coordinate range (S251). The white point setting position is adjusted according to the target coordinate value (S252). It is checked whether the white point is located at the position where the target coordinate value is located (step S253). If the white point is not located at the position where the target coordinate value is located, go back to step S252, and adjusting the white point setting position according to the target coordinate value, and if the white point is located at the position where the target coordinate value is located, recording the adjusted white point setting position in the second storage location (S254). In addition, the grayscale coefficient of the display panel may also be adjusted, and the adjusted grayscale coefficient is recorded in the first storage location (step S255).

Figure 7B:
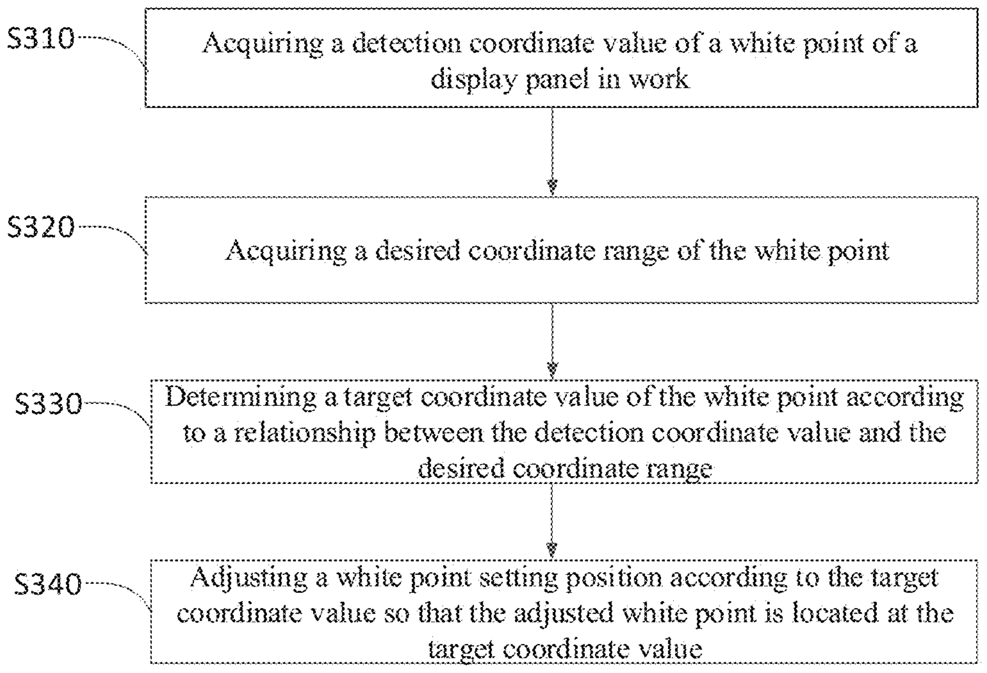
FIG. 7B shows a flowchart of yet another adjusting method of a display panel according to at least one embodiment of the present disclosure.

At least one embodiment of the present disclosure further provides yet another adjusting method of a display panel. FIG. 7B shows a flowchart of yet another adjusting method of a display panel according to at least one embodiment of the present disclosure.

As shown in FIG. 7B, the adjusting method includes steps S310-S340 as below.

Step S310: acquiring a detection coordinate value of a white point of a display panel in work.

Step S320: acquiring a desired coordinate range of the white point.

Step S330: determining a target coordinate value of the white point according to a relationship between the detection coordinate value and the desired coordinate range.

Step S340: adjusting a white point setting position according to the target coordinate value so that the adjusted white point is located at the target coordinate value.

For example, step S320 may further include acquiring a preset coordinate value and a permissible offset value of the white point; and determining the desired coordinate range according to the preset coordinate value and the permissible offset value.

For example, step S330 may further include determining a point within the desired coordinate range that is closest in distance to the detection coordinate value and taking the coordinates of the closest point as the target coordinate value.

For example, the adjusting method of the display panel may refer to the relevant description of any one of the above embodiments, which will not be repeated herein.

Figure 7C:
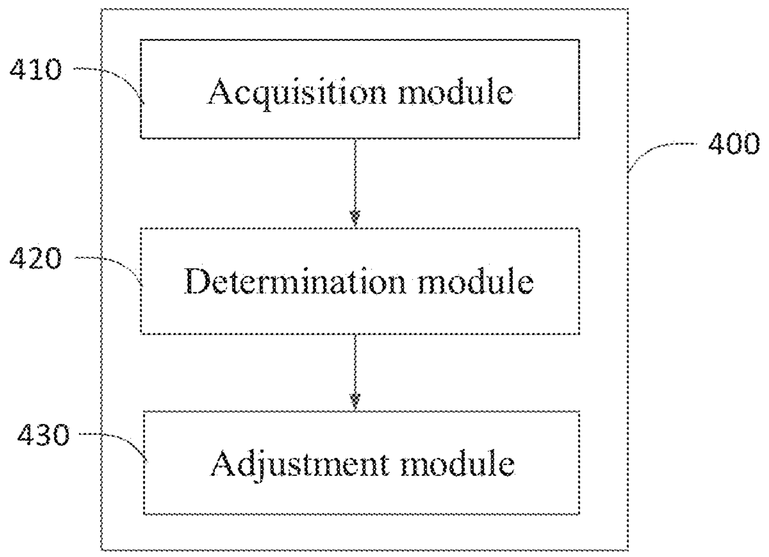
FIG. 7C shows a schematic block diagram of an adjusting apparatus of a display panel according to at least one embodiment of the present disclosure.

FIG. 7C shows a schematic block diagram of an adjusting apparatus 400 of a display panel according to at least one embodiment of the present disclosure.

For example, as shown in FIG. 7C, the adjusting apparatus 400 of the display panel includes an acquisition module 410, a determination module 420, and an adjustment module 430. These components may be interconnected via a bus system and/or other forms of connection mechanisms (not shown). These modules may be implemented, for example, by a hardware (e.g., circuit) module, a software module, or any combination of the two. The following embodiments are identical thereto, which will not be repeated herein. For example, the units may be implemented by a central processing unit (CPU), a graphics processing unit (GPU), a tensor processing unit (TPU), a field-programmable gate array (FPGA), or other forms of processing units having data processing capabilities and/or instruction execution capabilities, as well as corresponding computer instructions. It should be noted that the components and structure of the adjusting apparatus 400 of the display panel shown in FIG. 7B are merely exemplary and not limiting, and the adjusting apparatus 400 of the display panel may also have other components and structures as needed.

The acquisition module 410 is configured to acquire a detection coordinate value of a white point of a display panel in work. The acquisition module 410 may, for example, perform step S110 described in FIG. 2.

The determination module 420 is configured to determine a target adjustment mode from at least two adjustment modes according to the detection coordinate value, where the at least two adjustment modes include a first adjustment mode and a second adjustment mode; and the determination module 420 may, for example, perform step S120 described in FIG. 2.

The adjustment module 430 is configured to adjust at least some of parameters of the display panel on the basis of the target adjustment mode, where the parameters of the display panel include the grayscale coefficient and the white point setting position, adjusting the grayscale coefficient and taking the detection coordinate value as the white point setting position in the first adjustment mode, and adjusting the grayscale coefficient and adjusting the white point setting position according to the detection coordinate value in the second adjustment mode. The adjustment module 430 may, for example, perform step S130 described in FIG. 2.

For example, the acquisition module 410, the determination module 420 and the adjustment module 430 may be a hardware, a software, a firmware, and any feasible combination thereof. For example, the acquisition module 410, the determination module 420 and the adjustment module 430 may be specialized or general-purpose circuits, chips or devices, etc., or a combination of a processor and a memory. The embodiments of the present disclosure do not limit the specific implementation forms of the units described above.

For example, the acquisition module 410, the determination module 420 and the adjustment module 430 may include code and a program stored in a memory; the processor may execute the code and the program to implement some or all of the functions of the acquisition module 410, the determination module 420 and the adjustment module 430 described above. For example, the acquisition module 410, the determination module 420, and the adjustment module 430 may be specialized hardware devices configured to implement some or all of the functions of the acquisition module 410, the determination module 420, and the adjustment module 430 as described above. For example, the acquisition module 410, the determination module 420, and the adjustment module 430 each may be a circuit board or a combination of circuit boards for implementing the functions as described above. In the embodiments of the present disclosure, the one circuit board or the combination of a plurality of circuit boards may include (1) one or more processors; (2) one or more non-transitory memories connected to the processors; and (3) processor-executable firmware stored in the memories.

It is to be noted that in the embodiments of the present disclosure, each of the units of the adjusting apparatus 400 of the display panel corresponds to each step of the adjusting method of the display panel described above, the specific functions of the adjusting apparatus 400 of the display panel may be referred to the relevant descriptions of the adjusting method of the display panel, which will not be repeated herein. The components and structure of the adjusting apparatus 400 of the display panel shown in FIG. 7C are merely exemplary and not limiting, and the adjusting apparatus 400 of the display panel may further include other components and structure as needed. The adjusting apparatus 400 of the display panel may include more or fewer circuits or units, and the connection relationship between the individual circuits or units is not limited and may be defined based on actual needs. The specific way in which the individual circuits or units are constituted is not limited. The circuits or units each may be constituted by an analog device according to the circuit principle, or by a digital chip, or in other applicable ways.

At least one embodiment of the present disclosure further provides an electronic device. The electronic device includes a processor and a memory, and the memory stores one or more computer program modules. The one or more computer program modules are configured to be executed by the processor to implement the adjusting method of the display panel described above.

Figure 8A:
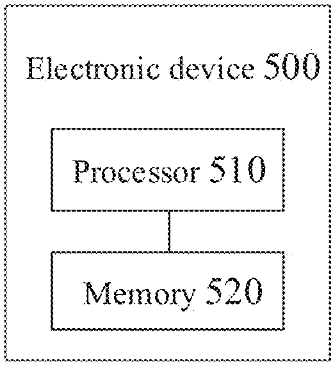
FIG. 8A shows a schematic block diagram of an electronic device according to at least one embodiment of the present disclosure.

FIG. 8A shows a schematic block diagram of an electronic device according to at least one embodiment of the present disclosure. As illustrated in FIG. 8A, the electronic device 500 includes a processor 510 and a memory 520. The memory 520 is configured to store non-transitory computer-readable instructions (e.g., one or more computer program modules). The processor 510 is configured to execute the non-transitory computer-readable instructions, and when the non-transitory computer-readable instructions are executed by the processor 510, one or more steps in the task processing method described above are performed. The memory 520 and the processor 510 may be interconnected by a bus system and/or other forms of connection mechanisms (not illustrated). The specific realization of each step of the adjusting method of the display panel and related explanations can be found in the embodiment of the adjusting method of the display panel described above, and the repetition will not be repeated herein.

It should be noted that the components of the electronic device 500 shown in FIG. 8A are exemplary and not limiting, and the electronic device 500 may have other components as needed for practical applications.

For example, the processor 510 and the memory 520 may communicate with each other directly or indirectly.

For example, the processor 510 and the memory 520 may communicate via a network. The network may include a wireless network, a wired network, and/or any combination of a wireless network and a wired network. The processor 510 and the memory 520 may also communicate with each other via a system bus, which is not limited by the present disclosure.

For example, the processor 510 and the memory 520 may be set up on the server side (or in the cloud).

For example, the processor 510 may control other components in the electronic device 500 to perform desired functions. For example, the processor 510 is a central processing unit (CPU), a graphics processing unit (GPU), or other forms of processing units having data processing capabilities and/or program execution capabilities. For example, the central processing unit (CPU) may be an X86 or ARM architecture, and the like. The processor 510 may be a general-purpose processor or a special-purpose processor, and can control other components in the electronic device 500 to perform desired functions.

For example, the memory 520 includes any combination of one or more computer program products, which may include various forms of computer-readable storage media, such as volatile memory and/or non-volatile memory. The volatile memory may include, for example, random access memory (RAM) and/or cache memory, etc. The non-volatile memory may include, for example, read-only memory (ROM), hard disk, erasable programmable read-only memory (EPROM), compact disk read-only memory (CD-ROM), USB memory, flash memory, and the like. One or more computer program modules may be stored on the computer-readable storage medium, and the processor 510 can execute one or more computer program modules to achieve various functions of the electronic device 500. Various application programs, various data, and various data used and/or generated by the application programs may also be stored in the computer-readable storage medium.

For example, in some embodiments, the electronic device 500 may be a cell phone, a tablet computer, an electronic paper, a television, a monitor, a laptop computer, a digital photo frame, a navigator, a wearable electronic device, a smart home device, and the like.

For example, the electronic device 500 may include a display panel, the display panel can be used for image segmentation and so on. For example, the display panel may be a rectangular panel, a circular panel, an oval panel, or a polygonal panel, and the like. In addition, the display panel can be not only a flat panel, but also a curved panel or even a spherical panel.

For example, the electronic device 500 may have a touch function, that is, the electronic device 500 may be a touch device.

It should be noted that, in the embodiments of the present disclosure, the specific functions and technical effects of the electronic device 500 may refer to the above description about the adjusting method of the display panel, which will not be repeated herein.

Figure 8B:
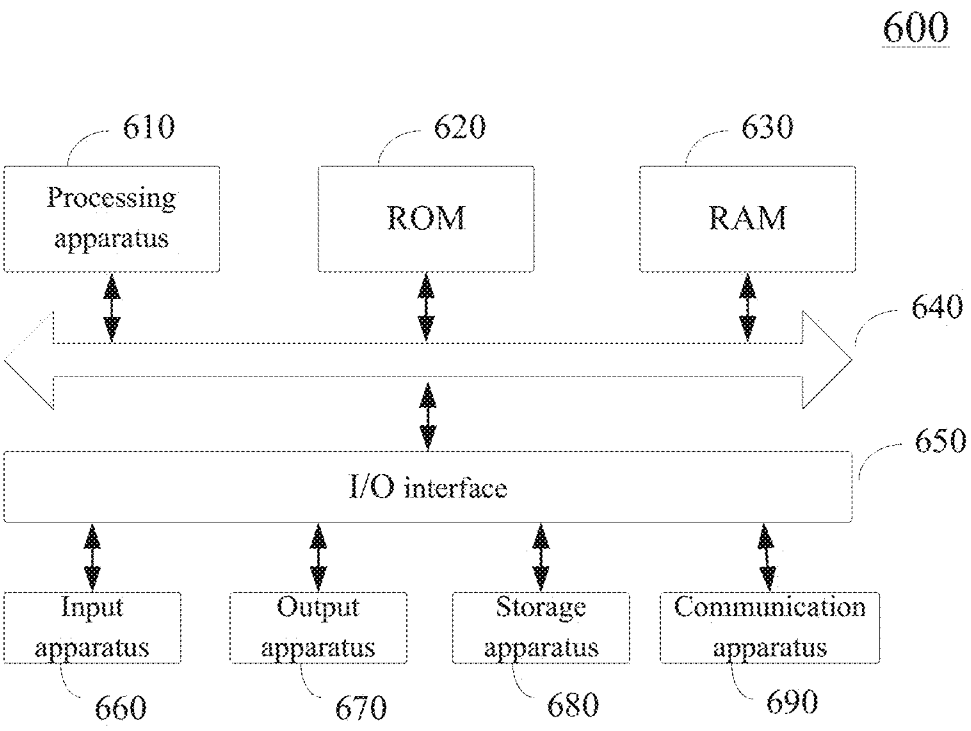
FIG. 8B shows a schematic block diagram of another electronic device according to at least one embodiment of the present disclosure.

FIG. 8B shows a schematic block diagram of another electronic device according to at least one embodiment of the present disclosure. The electronic device 600 is, for example, suitable for implementing the adjusting method of the display panel provided by the embodiments of the present disclosure. The electronic device 600 may be a terminal device or the like. It should be noted that the electronic device 600 illustrated in FIG. 8B is only an example, which does not limit the functions and application scope of the embodiments of the present disclosure.

As illustrated in FIG. 8B, the electronic device 600 includes a processing apparatus 610 (such as a central processing unit, a graphics processing unit, etc.) that can perform various appropriate actions and processes in accordance with a program stored in read-only memory (ROM) 620 or loaded from a storage apparatus 680 into random access memory (RAM) 630. In the RAM 630, various programs and data required for the operation of the electronic device 600 are also stored. The processing apparatus 610, the ROM 620 and the RAM 630 are connected to each other through a bus 640. An input/output (I/O) interface 650 is also connected to the bus 640.

Usually, the following apparatus may be connected to the I/O interface 650: an input apparatus 660 including, for example, a touch screen, a touch pad, a keyboard, a mouse, a camera, a microphone, an accelerometer, a gyroscope, or the like; an output apparatus 670 including, for example, a liquid crystal display (LCD), a loudspeaker, a vibrator, or the like; the storage apparatus 680 including, for example, a magnetic tape, a hard disk, or the like; and a communication apparatus 690. The communication apparatus 690 may allow the electronic device 600 to be in wireless or wired communication with other devices to exchange data. While FIG. 8B illustrates the electronic device 600 having various apparatuses, it should be understood that not all of the illustrated apparatuses are necessarily implemented or included, and the electronic device 600 may alternatively implement or have more or fewer apparatuses.

For example, according to the embodiments of the present disclosure, the adjusting method of the display panel described above can be implemented as a computer software program. For example, the embodiments of the present disclosure include a computer program product, which includes a computer program carried by a non-transitory computer-readable medium, and the computer program includes program codes for performing the adjusting method of the display panel described above. In such embodiments, the computer program may be downloaded online through the communication apparatus 690 and installed, or may be installed from the storage apparatus 680, or may be installed from the ROM 620. When the computer program is executed by the processing apparatus 610, the functions defined in the adjusting method of the display panel provided by the embodiments of the present disclosure can be achieved.

At least one embodiment of the present disclosure further provides a computer-readable storage medium for storing non-transitory computer-readable instructions, and when the non-transitory computer-readable instructions are executed by a computer, the above-mentioned adjusting method of the display panel is achieved. The specific functions and technical effects of the computer-readable storage media can refer to the descriptions of the adjusting method of the display panel in the previous text, which will not be repeated herein.

Figure 9:
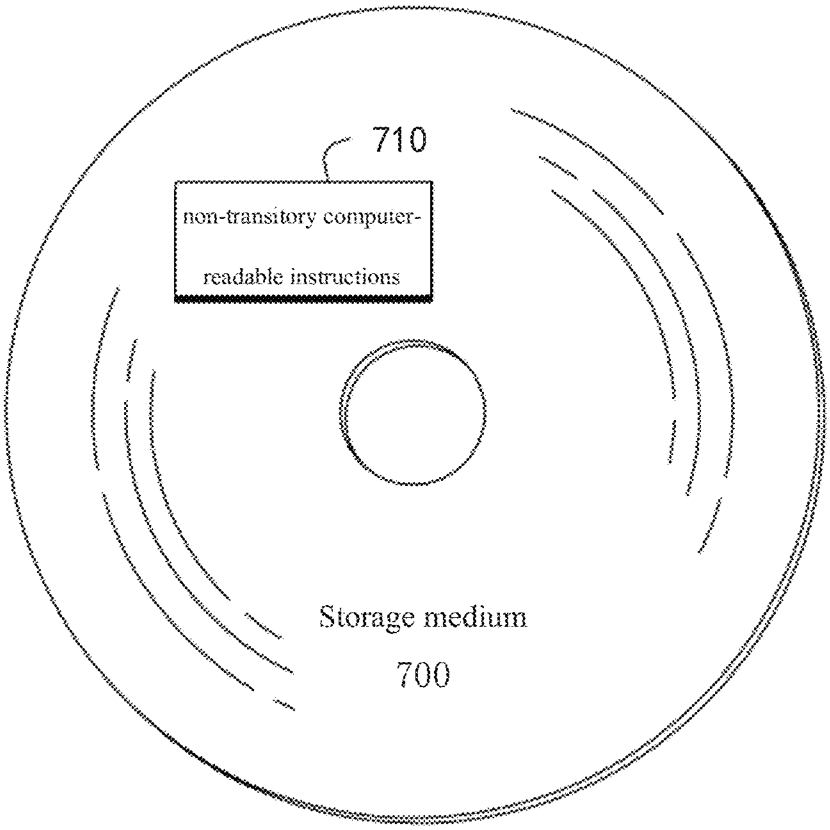
FIG. 9 shows a schematic diagram of a computer-readable storage medium according to at least one embodiment of the present disclosure.

FIG. 9 shows a schematic diagram of a computer-readable storage medium according to at least one embodiment of the present disclosure. As illustrated in FIG. 9, the storage medium 700 is configured to store non-transitory computer-readable instructions 710. For example, when the non-transitory computer-readable instructions 710 are executed by a computer, one or more steps in the adjusting method of the display panel described above may be performed.

For example, the storage medium 700 can be applied to the above-mentioned electronic device 500. For example, the storage medium 700 is the memory 520 in the electronic device 500 illustrated in FIG. 8A. For example, the relevant descriptions about the storage medium 700 can refer to the corresponding descriptions of the memory 520 in the electronic device 500 illustrated in FIG. 8A, which will not be repeated herein.

Although a computer system having various apparatus is illustrated, it should be understood that the computer system is not required to have all of the apparatus illustrated, alternatively, and the computer system may have more or less apparatus.

The above description is only the explanation of preferred embodiments of the present disclosure and the used technical principle. It should be understood by those skilled in the art that the disclosure scope involved in the present disclosure is not limited to the technical solution formed by the specific combination of the above technical features, but also covers other technical solutions formed by any combination of the above technical features or their equivalent features without departing from the above disclosed concept. For example, the technical solution formed by replacing the above features with (but not limited to) technical features with similar functions disclosed in the present disclosure.

In addition, although the operations are depicted in a specific order, this should not be understood as requiring these operations to be performed in the specific order shown or in a sequential order. Under certain circumstances, multitasking and parallel processing may be beneficial. Similarly, although several specific implementation details are included in the above discussion, these should not be interpreted as limiting the scope of the present disclosure. Some features described in the context of separate embodiments may also be implemented in a single embodiment in combination. On the contrary, various features described in the context of a single embodiment may also be implemented in a plurality of embodiments alone or in any suitable sub-combination.

Although the subject matter has been described in language specific to structural features and/or logical actions of methods, it should be understood that the subject matter defined in the appended claims is not necessarily limited to the specific features or actions described above. On the contrary, the specific features and actions described above are only example forms of realizing the claims.

For the present disclosure, the following statements should be noted:

(1) The drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

The invention claimed is:

1. An adjusting method for a display panel, comprising:

acquiring a detection coordinate value of a white point of the display panel in operation;

determining a target adjustment mode from at least two adjustment modes according to the detection coordinate value, wherein the at least two adjustment modes comprise a first adjustment mode and a second adjustment mode; and adjusting at least some parameters of the display panel on a basis of the target adjustment mode, wherein the at least some parameters of the display panel comprise a grayscale coefficient and a white point setting position, adjusting the grayscale coefficient and taking the detection coordinate value as the white point setting position in the first adjustment mode, and adjusting the grayscale coefficient and adjusting the white point setting position according to the detection coordinate value in the second adjustment mode;

the determining of the target adjustment mode from the at least two adjustment modes according to the detection coordinate value comprises: acquiring a desired coordinate range of the white point;

the adjusting of at least some of the parameters of the display panel on the basis of the target adjustment mode comprises: determining a target coordinate value of the white point according to the detection coordinate value, wherein the target coordinate value is in the desired coordinate range;

the desired coordinate range is from a first boundary coordinate to a second boundary coordinate in a first direction and from a third boundary coordinate to a fourth boundary coordinate in a second direction, the first boundary coordinate is less than the second boundary coordinate and the third boundary coordinate is less than the fourth boundary coordinate;

the detection coordinate value comprises a first detection coordinate and a second detection coordinate; and the determining of the target coordinate value of the white point according to the detection coordinate value comprises:

if the first detection coordinate is in the desired coordinate range and the second detection coordinate is greater than the fourth boundary coordinate, taking the first detection coordinate and the fourth boundary coordinate as the target coordinate value;

if the first detection coordinate is in the desired coordinate range and the second detection coordinate is less than the third boundary coordinate, taking the first detection coordinate and the third boundary coordinate as the target coordinate value;

if the second detection coordinate is in the desired coordinate range and the first detection coordinate is greater than the second boundary coordinate, taking the second boundary coordinate and the second detection coordinate as the target coordinate value; and if the second detection coordinate is in the desired coordinate range and the first detection coordinate is less than the first boundary coordinate, taking the first boundary coordinate and the second detection coordinate as the target coordinate value.

2. The adjusting method according to claim 1, wherein the determining of the target adjustment mode from the at least two adjustment modes according to the detection coordinate value further comprises:

determining the first adjustment mode to be the target adjustment mode in a case where the detection coordinate value is in the desired coordinate range.

3. The adjusting method according to claim 2, wherein the acquiring of the desired coordinate range of the white point comprises:

acquiring a preset coordinate value and a permissible offset value of the white point; and determining the desired coordinate range according to the preset coordinate value and the permissible offset value.

4. The adjusting method according to claim 3, wherein the determining of the target coordinate value of the white point according to the detection coordinate value comprises:

determining a point within the desired coordinate range that is closest in distance to the detection coordinate value; and taking a coordinate of the closest point as the target coordinate value.

5. The adjusting method according to claim 3, further comprises:

after adjusting at least some of the parameters of the display panel, recording an acquired grayscale coefficient in a first storage location and recording the acquired white point setting position in a second storage location.

6. The adjusting method according to claim 5, wherein the recording of the acquired white point setting position in the second storage location comprises:

checking whether the adjusted white point setting position is located at the target coordinate value after adjusting the white point setting position; and if the adjusted white point setting position is located at the target coordinate value, recording the adjusted white point setting position in the second storage location.

7. The adjusting method according to claim 2, wherein the adjusting of the at least some of the parameters of the display panel on the basis of the target adjustment mode further comprises:

adjusting the white point setting position according to the target coordinate value so that the adjusted white point setting position is located at the target coordinate value.

8. The adjusting method according to claim 1, wherein the determining of the target adjustment mode from the at least two adjustment modes according to the detection coordinate value further comprises:

determining the second adjustment mode to be the target adjustment mode in a case where the detection coordinate value is outside the desired coordinate range.

9. The adjusting method according to claim 8, wherein the acquiring of the desired coordinate range of the white point comprises:

acquiring a preset coordinate value and a permissible offset value of the white point; and determining the desired coordinate range according to the preset coordinate value and the permissible offset value.

10. The adjusting method according to claim 8, wherein the adjusting of the at least some of the parameters of the display panel on the basis of the target adjustment mode further comprises:

adjusting the white point setting position according to the target coordinate value so that the adjusted white point setting position is located at the target coordinate value.

11. The adjusting method according to claim 1, wherein the adjusting of at least some of the parameters of the display panel on the basis of the target adjustment mode further comprises:

adjusting the white point setting position according to the target coordinate value so that the adjusted white point setting position is located at the target coordinate value.

12. The adjusting method according to claim 11, wherein the determining of the target coordinate value of the white point according to the detection coordinate value comprises:

if the first detection coordinate is greater than the second boundary coordinate and the second detection coordinate is greater than the fourth boundary coordinate, taking the second boundary coordinate and the fourth boundary coordinate as the target coordinate value;

if the first detection coordinate is less than the first boundary coordinate and the second detection coordinate is less than the third boundary coordinate, taking the first boundary coordinate and the third boundary coordinate as the target coordinate value;

if the first detection coordinate is greater than the second boundary coordinate and the second detection coordinate is less than the third boundary coordinate, taking the second boundary coordinate and the third boundary coordinate as the target coordinate value; and if the first detection coordinate is less than the first boundary coordinate and the second detection coordinate is greater than the fourth boundary coordinate, taking the first boundary coordinate and the fourth boundary coordinate as the target coordinate value.

13. The adjusting method according to claim 1, wherein the acquiring of the detection coordinate value of the white point of the display panel in operation comprises:

adjusting backlight luminance of the display panel to a preset luminance range; and determining the detection coordinate value of the white point on the basis of collected optical information of a white screen of the display panel.

14. The adjusting method according to claim 13, wherein the acquiring of the detection coordinate value of the white point of the display panel in operation comprises:

adjusting flicker of the display panel to a preset flicker range.

15. An electronic device, comprising:

a processor; and a memory, storing one or more computer program modules;

wherein the one or more computer program modules are configured to be executed by the processor to implement the adjusting method of the display panel according to claim 1.

16. A non-transitory computer-readable storage medium, storing an instruction, the instruction being executed by a computer to implement the adjusting method of the display panel according to claim 1.

17. An adjusting method of a display panel, comprising:

acquiring a detection coordinate value of a white point of a display panel in operation;

acquiring a preset coordinate value and a permissible offset value of the white point; and determining a desired coordinate range according to the preset coordinate value and the permissible offset value;

if the detection coordinate value is in the desired coordinate range, taking the detection coordinate value as a target coordinate value;

if the detection coordinate value is located outside the desired coordinate range, determining the target coordinate value on a basis of a distance between the detection coordinate value and the desired coordinate range, adjusting the white point setting position according to the target coordinate value, checking whether the white point is located at the position where the target coordinate value is located, if the white point is not located at the position where the target coordinate value is located, adjusting the white point setting position according to the target coordinate value, and if the white point is located at the position where the target coordinate value is located, recording the adjusted white point setting position in the second storage location.

18. An adjusting apparatus of a display panel, comprising:

an acquisition module, configured to acquire a detection coordinate value of a white point of a display panel in operation;

a determination module, configured to determine a target adjustment mode from at least two adjustment modes according to the detection coordinate value, wherein the at least two adjustment modes comprise a first adjustment mode and a second adjustment mode; and an adjustment module, configured to adjust at least some parameters of the display panel on a basis of the target adjustment mode, wherein the at least some parameters of the display panel comprise grayscale coefficient and white point setting position, adjusting the grayscale coefficient and taking the detection coordinate value as the white point setting position in the first adjustment mode, and adjusting the grayscale coefficient and adjusting the white point setting position according to the detection coordinate value in the second adjustment mode;

the determination module is further configured to acquire a desired coordinate range of the white point;

the adjustment module is further configured to determine a target coordinate value of the white point according to the detection coordinate value, wherein the target coordinate value is in the desired coordinate range;

the desired coordinate range is from a first boundary coordinate to a second boundary coordinate in a first direction and from a third boundary coordinate to a fourth boundary coordinate in a second direction, the first boundary coordinate is less than the second boundary coordinate and the third boundary coordinate is less than the fourth boundary coordinate;

the detection coordinate value comprises a first detection coordinate and a second detection coordinate; and the adjustment module is further configured to:

if the first detection coordinate is in the desired coordinate range and the second detection coordinate is greater than the fourth boundary coordinate, take the first detection coordinate and the fourth boundary coordinate as the target coordinate value;

if the first detection coordinate is in the desired coordinate range and the second detection coordinate is less than the third boundary coordinate, take the first detection coordinate and the third boundary coordinate as the target coordinate value;

if the second detection coordinate is in the desired coordinate range and the first detection coordinate is greater than the second boundary coordinate, take the second boundary coordinate and the second detection coordinate as the target coordinate value; and if the second detection coordinate is in the desired coordinate range and the first detection coordinate is less than the first boundary coordinate, take the first boundary coordinate and the second detection coordinate as the target coordinate value.

* * * * *